United States Patent
Edwards

(10) Patent No.: US 9,613,356 B2
(45) Date of Patent: Apr. 4, 2017

(54) SECURE PASSCODE ENTRY USER INTERFACE

(71) Applicant: Square, Inc., San Francisco, CA (US)

(72) Inventor: Troy J. Edwards, Los Gatos, CA (US)

(73) Assignee: SQUARE, INC., San Francisco, CA (US)

(*) Notice: Subject to any disclaimer, the term of this patent is extended or adjusted under 35 U.S.C. 154(b) by 566 days.

(21) Appl. No.: 14/050,216

(22) Filed: Oct. 9, 2013

(65) Prior Publication Data

US 2015/0100498 A1 Apr. 9, 2015

Related U.S. Application Data

(63) Continuation-in-part of application No. 14/041,863, filed on Sep. 30, 2013.

(51) Int. Cl.
 G06Q 20/40 (2012.01)
 G06Q 20/20 (2012.01)

(52) U.S. Cl.
 CPC ......... G06Q 20/4012 (2013.01); G06Q 20/20 (2013.01)

(58) Field of Classification Search
 CPC ... G06Q 20/4012; G06Q 20/40; G06Q 20/322
 See application file for complete search history.

(56) References Cited

U.S. PATENT DOCUMENTS

| | | |
|---|---|---|
| 5,903,652 A | 5/1999 | Mital |
| 6,257,486 B1 | 7/2001 | Teicher et al. |
| 6,434,702 B1 * | 8/2002 | Maddalozzo, Jr. ... G06F 3/0238 382/115 |
| 6,549,194 B1 * | 4/2003 | McIntyre ............ G06F 21/6218 340/5.4 |
| 6,925,169 B2 | 8/2005 | Habu |

(Continued)

FOREIGN PATENT DOCUMENTS

| | | |
|---|---|---|
| EP | 1 806 653 A1 | 7/2007 |
| EP | 2 207 124 A2 | 7/2010 |

(Continued)

OTHER PUBLICATIONS

International Search Report and Written Opinion mailed Jan. 12, 2015 for International Patent Application No. PCT/US2014/057050, filed Sep. 23, 2014.

(Continued)

*Primary Examiner* — Narayanswamy Subramanian
*Assistant Examiner* — Christopher Bridges
(74) *Attorney, Agent, or Firm* — Mattingly & Malur, PC

(57) ABSTRACT

A method for secure passcode entry is disclosed. The method, in one embodiment, includes: receiving a request for authenticating a user; in response to the request, generating a passcode entry interface including buttons corresponding to character options for composing a passcode entry, wherein the passcode entry interface is used to receive the passcode entry to authenticate a user of the payment card; identifying, on a touchscreen of the electronic device, a traffic region that experienced touch events prior to receiving the request; and displaying the passcode entry interface on the touchscreen such that at least a portion of the passcode entry interface is positioned in the traffic region.

21 Claims, 19 Drawing Sheets

(56) References Cited

U.S. PATENT DOCUMENTS

| | | | |
|---|---|---|---|
| 7,058,613 B1 | 6/2006 | Sato et al. | |
| 7,096,256 B1 | 8/2006 | Shafer | |
| 7,333,602 B2* | 2/2008 | Habu | G06F 3/0219 |
| | | | 379/368 |
| 7,641,111 B2 | 1/2010 | Adams et al. | |
| 7,698,563 B2* | 4/2010 | Shin | G06F 21/36 |
| | | | 713/184 |
| 8,281,998 B2* | 10/2012 | Tang | G06Q 20/32 |
| | | | 235/380 |
| 8,392,846 B2* | 3/2013 | Carapelli | G06Q 20/206 |
| | | | 345/173 |
| 8,500,018 B2* | 8/2013 | McKelvey | G06Q 20/10 |
| | | | 235/379 |
| 8,613,070 B1 | 12/2013 | Borzycki et al. | |
| 8,978,975 B2 | 3/2015 | Barnett | |
| 9,141,977 B2 | 9/2015 | Davis et al. | |
| 2002/0188872 A1* | 12/2002 | Willeby | G06F 3/04886 |
| | | | 726/7 |
| 2002/0196274 A1 | 12/2002 | Comfort et al. | |
| 2003/0182558 A1* | 9/2003 | Lazzaro | G06Q 30/0641 |
| | | | 713/183 |
| 2005/0212763 A1 | 9/2005 | Okamura | |
| 2005/0250538 A1 | 11/2005 | Narasimhan et al. | |
| 2005/0251451 A1 | 11/2005 | Tan et al. | |
| 2006/0053301 A1 | 3/2006 | Shin | |
| 2006/0165060 A1 | 7/2006 | Dua | |
| 2006/0218397 A1 | 9/2006 | Brown et al. | |
| 2006/0224523 A1* | 10/2006 | Elvitigala | G06F 3/04886 |
| | | | 705/64 |
| 2007/0096946 A1* | 5/2007 | Kim | G09C 1/00 |
| | | | 341/22 |
| 2007/0241180 A1 | 10/2007 | Park et al. | |
| 2007/0250920 A1 | 10/2007 | Lindsay | |
| 2008/0017711 A1 | 1/2008 | Adams et al. | |
| 2008/0091944 A1 | 4/2008 | vo Mueller et al. | |
| 2008/0098464 A1 | 4/2008 | Mizrah | |
| 2008/0165151 A1 | 7/2008 | Lemay et al. | |
| 2008/0189214 A1 | 8/2008 | Mueller et al. | |
| 2008/0244714 A1 | 10/2008 | Kulakowski et al. | |
| 2009/0172810 A1 | 7/2009 | Won et al. | |
| 2009/0237361 A1 | 9/2009 | Mosby et al. | |
| 2009/0265776 A1 | 10/2009 | Baentsch et al. | |
| 2009/0271276 A1 | 10/2009 | Roberts | |
| 2009/0307768 A1* | 12/2009 | Zhang | G06F 21/36 |
| | | | 726/19 |
| 2010/0153273 A1 | 6/2010 | Sellars et al. | |
| 2011/0007008 A1* | 1/2011 | Algreatly | G06F 3/03547 |
| | | | 345/173 |
| 2011/0090097 A1* | 4/2011 | Beshke | B60R 25/23 |
| | | | 341/20 |
| 2011/0204140 A1 | 8/2011 | Hart et al. | |
| 2012/0054401 A1 | 3/2012 | Cheng | |
| 2012/0084206 A1 | 4/2012 | Mehew et al. | |
| 2012/0095914 A1 | 4/2012 | McKelvey et al. | |
| 2012/0130903 A1 | 5/2012 | Dorsey et al. | |
| 2012/0162124 A1 | 6/2012 | Lin | |
| 2012/0174215 A1 | 7/2012 | Steeves | |
| 2012/0287064 A1 | 11/2012 | Kunori | |
| 2012/0303960 A1 | 11/2012 | Wankmueller et al. | |
| 2013/0046697 A1 | 2/2013 | Schibuk | |
| 2013/0085941 A1 | 4/2013 | Rosenblatt et al. | |
| 2013/0119130 A1 | 5/2013 | Braams | |
| 2013/0144792 A1 | 6/2013 | Nilsson et al. | |
| 2013/0185167 A1 | 7/2013 | Mestre et al. | |
| 2013/0239187 A1 | 9/2013 | Leddy et al. | |
| 2013/0246272 A1 | 9/2013 | Kirsch | |
| 2013/0305392 A1* | 11/2013 | Bar-El | H04L 9/08 |
| | | | 726/29 |
| 2013/0328801 A1 | 12/2013 | Quigley et al. | |
| 2013/0332360 A1 | 12/2013 | Quigley et al. | |
| 2013/0332367 A1 | 12/2013 | Quigley et al. | |
| 2013/0333011 A1 | 12/2013 | Quigley et al. | |
| 2014/0020117 A1 | 1/2014 | Nagai et al. | |
| 2014/0057621 A1 | 2/2014 | Ji et al. | |
| 2014/0324708 A1 | 10/2014 | McCauley et al. | |
| 2015/0249662 A1 | 9/2015 | Iwanski et al. | |
| 2016/0150411 A1 | 5/2016 | Liu et al. | |
| 2016/0275515 A1 | 9/2016 | Quigley et al. | |

FOREIGN PATENT DOCUMENTS

| | | |
|---|---|---|
| GB | 2 373 616 A | 9/2002 |
| JP | 2000-305899 A | 11/2000 |
| KR | 10-2010-0047097 A | 5/2010 |
| WO | 2010/097711 A2 | 9/2010 |
| WO | 2011/093998 A1 | 8/2011 |
| WO | 2012/122175 A1 | 9/2012 |
| WO | 2013/188599 A2 | 12/2013 |
| WO | 2015/017130 A1 | 2/2015 |
| WO | 2015/048040 A1 | 4/2015 |
| WO | 2015/048041 A1 | 4/2015 |

OTHER PUBLICATIONS

International Search Report and Written Opinion mailed Jan. 12, 2015 for International Patent Application No. PCT/US2014/057047, filed Sep. 23, 2014.

Co-Pending U.S. Appl. No. 14/041,863 by Edwards, T.J., filed Sep. 30, 2013.

Co-Pending U.S. Appl. No. 14/050,233 by Aaron, P. et al., filed Oct. 9, 2013.

Co-Pending U.S. Appl. No. 14/105,006 by Edwards, T.J., filed Dec. 12, 2013.

U.S. Appl. No. 14/026,187, of McCauley, N., filed Sep. 13, 2013.

U.S. Appl. No. 14/696,235, of Quigley, O.S.C, et al., filed Apr. 24, 2015.

International Search Report and Written Opinion mailed Dec. 12, 2013, for International Patent Application No. PCT/US2013/045523, filed Jun. 12, 2013.

International Search Report and Written Opinion mailed Oct. 31, 2014, for International Patent Application No. PCT/US2014/046923, filed Jul. 16, 2014.

Non-Final Office Action mailed Aug. 12, 2014, for U.S. Appl. No. 13/800,920, of Quigley, O.S.C., et al., filed Mar. 13, 2013.

Final Office Action mailed Feb. 18, 2015, for U.S. Appl. No. 13/800,920, of Quigley, O.S.C., et al., filed Mar. 13, 2013.

Non-Final Office Action mailed May 21, 2015, for U.S. Appl. No. 13/800,920, of Quigley, O.S.C., et al., filed Mar. 13, 2013.

"A Guide to EMV—Version 1.0 (presentation)," EMVCo, dated May 2011, pp. 1-39.

"A Guide to EMV—Version 1.0," EMVCo LLC, dated May 2011, pp. 1-35.

"EMV Essentials for US Credit Unions," A Mercator Advisory Group Research Brief Sponsored by CSCU, dated Mar. 22, 2012, pp. 1-15.

"MasterCard PayPass, Terminal Implementation Requirements," Mastercard Worldwide, 2007 v.1, on Sep. 10, 2015, pp. 1-62.

Fillmore, P., "Mobile and Contactless Payment and Security," v20111118, Witham Laboratories, on Nov. 18, 2011, pp. 1-39.

Non-Final Office Action mailed Oct. 1, 2015, for U.S. Appl. No. 13/800,610, of Quigley, O.S.C., et al., filed Mar. 13, 2013.

Non-Final Office Action mailed Oct. 1, 2015, for U.S. Appl. No. 13/799,724, of Quigley, O.S.C., et al., filed Mar. 13, 2013.

Non-Final Office Action mailed Oct. 7, 2015, for U.S. Appl. No. 13/800,789, of Quigley, O.S.C., et al., filed Mar. 13, 2013.

Final Office Action mailed Oct. 21, 2015, for U.S. Appl. No. 13/800,920, of Quigley, O.S.C., et al., filed Mar. 13, 2013.

Non-Final Office Action mailed Nov. 4, 2015, for U.S. Appl. No. 14/696,235, of Quigley, O.S.C., et al., filed Apr. 24, 2015.

Final Office Action mailed Apr. 22, 2016, for U.S. Appl. No. 13/800,610, of Quigley, O.S.C., et al., filed Mar. 13, 2013.

Final Office Action mailed Jun. 17, 2016, for U.S. Appl. No. 14/696,235, of Quigley, O.S.C., et al., filed Apr. 24, 2015.

Non-Final Office Action mailed Jun. 23, 2016, for U.S. Appl. No. 14/105,006, of Edwards, T.J., filed Dec. 12, 2013.

Notice of Allowance mailed Oct. 3, 2016, for U.S. Appl. No. 14/041,863, of Edwards, T.J., filed Sep. 30, 2013.

(56) References Cited

OTHER PUBLICATIONS

Final Office Action mailed Oct. 4, 2016, for U.S. Appl. No. 14/050,233, of Edwards, T.J., filed Oct. 9, 2013.
Advisory Action mailed Oct. 4, 2016, for U.S. Appl. No. 14/696,235, of Quigley, O.S.C., et al., filed Apr. 24, 2015.
Zezschwitz, et al., "Making Graphic-Based Authentication Secure against Smudge Attacks," Session: Emotion and User Modeling, IUI'13, dated Mar. 19-23, 2013, pp. 277-286.
Advisory Action mailed Jan. 22, 2016, for U.S. Appl. No. 13/800,920, of Quigley, O.S.C., et al., filed Mar. 13, 2013.
Final Office Action mailed Feb. 4, 2016, for U.S. Appl. No. 13/799,724, of Quigley, O.S.C., et al., filed Mar. 13, 2013.
Notice of Allowance mailed Mar. 11, 2016, for U.S. Appl. No. 13/800,920, of Quigley, O.S.C., filed Mar. 13, 2013.
Notice of Allowance mailed Mar. 23, 2016, for U.S. Appl. No. 13/800,789, of Quigley, O.S.C., filed Mar. 13, 2013.
Non-Final Office Action mailed Mar. 24, 2016, for U.S. Appl. No. 14/041,863, of Edwards, T.J., filed Sep. 30, 2013.
Non-Final Office Action mailed Mar. 24, 2016, for U.S. Appl. No. 14/050,233, of Edwards, T.J., filed Oct. 9, 2013.

\* cited by examiner

9,613,356 B2

SECURE PASSCODE ENTRY USER INTERFACE

CROSS-RELATED APPLICATIONS

This application is a continuation-in-part of U.S. patent application Ser. No. 14/041,863, filed on Sep. 30, 2013, entitled SCRAMBLING PASSCODE ENTRY INTERFACE, which is incorporated herein by reference in its entirety.

BACKGROUND

Security in accessing and transmitting information is as crucial as security to protect physical possessions. Conventional security devices, such as combination locks, may include devices that control access based on possession of a virtual "key," such as in the form of private information (e.g., a passcode). A passcode is a combination of a sequence of characters, such as letters, numbers, special characters, or any combination thereof. In the digital realm, passcode-based locks are emulated by digital passcode-based security devices, such as a key pad on an automatic teller machine (ATM) or a card reader for a debit card personal identification number (PIN) key pad. These digital passcode-based security devices are generally special-purpose hardware devices (i.e., lacking a general purpose operating system/kernel to run different functional components) that control access to a system based on a user's knowledge of a passcode. Conventional digital passcode-based security devices are implemented on special-purpose devices because of the ability to build concealment structures, such as a shield wall around the PIN key pad, around the special-purpose devices. Further, conventional digital passcode-based security devices are implemented on special-purpose devices because, among other reasons, any general-purpose device may be more vulnerable to installation of malware (i.e., software designed to overcome security without authorization).

For example, in a conventional transaction where payment is made by using a point-of-sale electronic payment card (e.g., a debit card or smart card such as a Europay, MasterCard, and Visa (EMV) card), a cardholder's identity and/or authenticity is confirmed by requiring the cardholder ("user") to enter a PIN rather than or in addition to signing a paper receipt. A user may enter a PIN entry on a PIN pad on a special-purpose card reader, on which a protective shield may partially surround the PIN pad. The card reader then retrieves an authentic PIN from the smart card. The user-entered PIN is compared against the authentic PIN from the smart card. Authorization of the use of the card is then granted when the user PIN entry matches the authentic PIN.

The example above involves using a special-purpose device to authorize a user, instead of using a general-purpose device, i.e., a device that has an operating system enabling any third party software application to run on it. A general-purpose device enables ease of implementation of security sensitive applications. For example, general-purpose devices may include personal computers, smart phones (e.g., Android phone or iPhone), or tablet computers (e.g., iPad, Kindle, Galaxy Tab, etc.). The ability to use general-purpose devices to implement a passcode-based authentication system enables merchants and consumers who wish to use or implement a secured authentication system to use devices they already own for that purpose. General-purpose devices also enable a wider selection of presentation capabilities, and thus enabling integration of a storefront with a payment authentication system.

Figure 1:
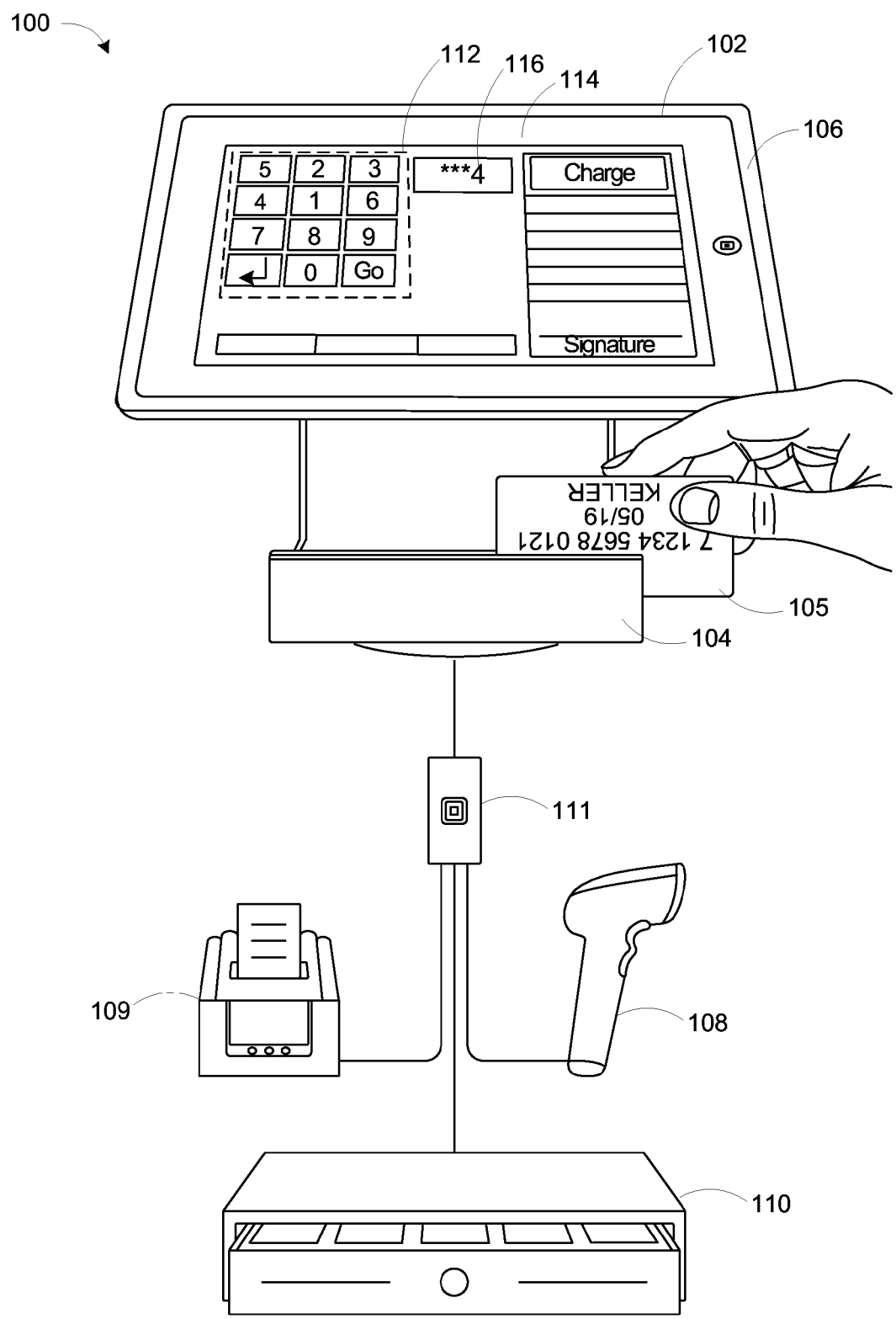
FIG. 1 is a system architecture diagram of a payment system illustrating a general-purpose electronic device for secured passcode entry.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Disclosed herein is a technique for secure passcode entry on a user interface of a general-purpose electronic device; the portion of the user interface used for passcode entry is henceforth referred to as the "passcode entry interface" in this description. Making a card reader part of the general-purpose electronic device may previously have been unfeasible because of the difficulty of defending against installation of malware on the same general-purpose device and the infeasibility of installing concealment structures around the general-purpose device. The disclosed technique includes mechanisms to conceal a user's passcode entry from unauthorized individuals attempting to discover the passcode (e.g., by looking over the shoulder of the user or by analyzing positions of fingerprints on a touchscreen of the electronic device). For example, the disclosed technique includes scrambling character labels on the passcode entry interface such that a character entry cannot be interpreted via just a glance. The disclosed technique is advantageous by enabling a general purpose device with a touchscreen to be used securely for passcode authentication. The concealment mechanisms are designed such that the general purpose device may be part of a payment system and satisfy the security requirements of the payment system.

In various embodiments, a passcode entry interface is generated on a touchscreen of the general-purpose electronic device. The general-purpose electronic device may be, for example, a mobile device, such as a tablet computer, a smart phone, or an e-reader, or stationary devices, such as personal computers or I/O terminals. The passcode entry interface may include a character entry mechanism, where a passcode entry comprises a sequence of character entries by the user. In some embodiments, the general-purpose device is coupled to a docking station. The passcode entry interface may be partially displayed on a display of the docking station. The docking station may include one or more control mechanisms for interacting with the passcode entry interface.

In various embodiments, the disclosed technique involves arranging soft buttons (displayed images or icons of buttons on a touch-sensitive display device) on the passcode entry interface in an out-of-sequence manner, where the soft buttons (hereinafter simply "buttons") correspond to character options for composing a passcode entry. The buttons may be of any shape, such as a square, a circle, or a hexagon, any single or mix of colors, and any size. For example, the buttons may be arranged randomly on the passcode entry interface. In some embodiments, the buttons are rearranged in response to a touch event on the touchscreen. The rearrangement may be on a random basis, where fixed button positions are assigned a random character from the character options for composing the passcode entry. For example, an initial passcode entry interface may be arranged out of sequence from a natural sequence of the character options (e.g., a numeric sequence or an alphabetical sequence). For another example, a subsequent passcode character entry (e.g., entry of a number of a PIN) may trigger rearranging of the buttons on the passcode entry interface. This mechanism helps to confuse any potential wrongdoer who may be looking over a user's shoulders while the user is entering the passcode entry.

In various embodiments, the position of the passcode entry interface and the positions of buttons on the passcode entry interface are configured based on a touch event history. For example, the general-purpose electronic device may record a touch event history based on user interactions with a user interface, such as a mobile storefront with menu items or a previously presented passcode entry interface, sharing the same touchscreen as the currently presented passcode entry interface. The mobile storefront may be positioned by the electronic device or a remote backend system. The touch event history can be used to identify regions of high finger touch traffic. The passcode entry interface and the buttons of the passcode entry interface may be selected to overlay the regions of high finger touch traffic in order to hinder any attempt by a wrongdoer to ascertain the passcode entry through fingerprint analysis of the touchscreen.

In other embodiments, the position of the passcode entry interface and the position of a storefront interface can alternate between different sessions of user interaction, such that each interface at least partially overlaps with one another. This is advantageous in creating an even distribution of finger touch traffic. As such, the alternating positions of the interfaces (e.g., the passcode entry interface) on the touchscreen may hinder any attempt to reverse engineer the passcode entry through fingerprint analysis.

In some embodiments, the passcode entry technique involves positioning the passcode entry interface at a corner of the touchscreen. This positioning enables a user to better shield the passcode entry interface with his/her hand while entering the passcode on the touchscreen.

In some embodiments, the passcode entry interface is shaped in a loop pattern as displayed on the touchscreen. A loop pattern is arranged such that buttons on the passcode entry interface follows a curve that is connected to its beginning. For example, the loop pattern can be a substantially circular pattern, a substantially elliptical pattern, a hexagonal pattern, a star pattern, etc. For example, the passcode entry interface may be shaped as a ring. The buttons corresponding to the character options for composing the passcode entry may be evenly spaced along the ring. The buttons corresponding to the character options may be arranged in sequence (e.g., numeric or alphabetic sequence), but the initial arrangement of the buttons may be according to a random rotation of the buttons around a center of the loop pattern shape. In some embodiments, each character entry based on a touch event on one of the buttons triggers a rearrangement of the buttons on the loop pattern shape, such as a new rotation of the buttons around the center of the loop pattern shape.

In various embodiments, a character entry is triggered by detection of a dialing gesture over the loop pattern passcode entry interface. The electronic device may detect a dialing gesture over the passcode entry interface, where buttons on the loop pattern passcode entry interface rotate in response to the dialing gesture. A fixed position along the loop pattern interface may be designated as a selection juncture, where after the dialing gesture, the character at the selection juncture is entered as part of the passcode entry, similar to operation of a rotary dial phone.

The loop pattern interface may include an even number of characters. When there is an even number of characters on the loop pattern passcode entry interface, relative positions between pairs of the buttons remain the same after randomized rotations of the buttons around the center of the loop pattern. Hence, the loop pattern interface is advantageous by allowing a semi-random arrangement of characters on the interface while maintaining a radial symmetry enabling users to quickly find the characters options for composing the passcode entry.

In various embodiments, touch events (e.g., X and Y coordinates of where each touch happens on the touchscreen) over the buttons on the touchscreen are encrypted. Configurations of display instances of the passcode entry interface may vary between each touch event, between each user session, between financial transactions, or between other time intervals. For example, configuration of a display instance can include the geometry, position, and/or arrangement of the buttons. The configuration of the display instance can be stored on the electronic device or remotely on an external server system. Together, the configuration of the displaced instance and the encrypted coordinates of the touch events during a time duration of the display instance can be used to determine the passcode entry by the user.

In various embodiments, the concealment mechanism includes ways of making it difficult to interpret characters on the passcode entry interface by a quick glance. For example, the electronic device can overlay a concealment layer over the passcode entry interface. The concealment layer may include random blots, line segments (e.g., straight, curved or wavy), spots, stains, blemishes, or other low density geometries to make it difficult for interpretation of the character labels on the buttons at a distance while convenient enough for interpretation by a close up look. As another example, the characters displayed on the buttons can include variations of stroke widths to achieve the same result. Different stroke widths on the characters tends to confuse a potential wrongdoer from interpreting the passcode entry by a quick glance. In other embodiments, a line moiré pattern slides over the passcode entry interface with character labels patterned to be revealed or concealed by the line moiré pattern. The sliding of the line moiré pattern obfuscates the characters on the buttons in a way such that only certain numbers can be visible at any given time.

In various embodiments, the passcode entry interface is displayed and presented as a selection reel/tumbler instead of a keypad. One or more selection reels may be displayed on the passcode entry interface. The selection reel may be displayed on the touchscreen. As an example, a swiping gesture on the touchscreen over the selection reel may enable switching of a selection from among character options for composing a passcode entry. As another example, a dial element may be displayed on the touchscreen, where a dialing gesture around the dial element enable switching among characters options for composing a passcode entry. As yet another example, a hardware dial may be part of the docking station coupled to the general-purpose electronic device. The hardware dial may detect a turning motion thereon and command a switch to select a character from among characters options for composing a passcode entry.

The selection reel may be displayed on the touchscreen of the general-purpose electronic device or a display on the docking station. For example, the display on the docking station may be within the hardware dial or at another portion of the docking station. A polarized screen may be placed over the touchscreen of the general-purpose electronic device or the display on the docking station. The polarized screen helps to prevent the passcode entry from being visible to someone looking over the shoulder of the user.

Once toggled to the desired character, the user may select a character on the selection reel. For example, a touch event on a button on the touchscreen can trigger the selection. As another example, pressing of a hardware button on the docking station can trigger the selection.

FIG. 1 shows a system architecture of a payment system 100, including a general-purpose electronic device 102 for secure passcode entry, in which the disclosed technique may be applied. The electronic device 102 is a general purpose data processing device. For example, the electronic device 102 may be a mobile phone, a tablet, an e-reader, other mobile or portable computing devices, or other stationary computing devices. The electronic device 102 may be configured to facilitate a financial transaction. The electronic device 102 may be coupled to a card reader 104, which can initiate a financial transaction to purchase items from a merchant operating the electronic device 102 upon detecting a swipe of a payment card 105.

In the illustrated embodiment, the card reader 104 is integral to a docking station 106 and is coupled to the electronic device 102 through the docking station 106. In other embodiments, however, the card reader 104 can be a separate component connected to the electronic device 102 or to the docking station 106. For example, in embodiments, the card reader 101 may be replaced by a dongle type attachment that plugs into an audio port or a data connector port of the electronic device 102. The dongle type attachment performs similar function of detecting swipe of the payment card 105 and transfers information of the payment card 105 to the electronic device 102. The electronic device 102 may fit into a cavity of the docking station 106 as shown.

In the illustrated embodiment, the docking station 106 and/or the electronic device 102 are coupled to one or more peripheral components, such as a label reader 108, a receipt printer 109, or a cashier drawer 110. The peripheral components can be coupled to the electronic device 102 through a hub device 111, such as a wired hub or a wireless router. A user may purchase various items for checkout through one of the peripheral components, such as through the label reader 108 coupled to the electronic device 102, through a user's mobile device, or through a storefront interface on the electronic device 102. During checkout, the card reader 104 can read and/or access the payment card 105. The payment card 105 may be a credit card, a debit card, an EMV card, or another type of passive or active payment device. The payment card 105 may communicate, for example, via magnetism, radio frequency, near field communication (NFC), acoustic wave, optical modulation, or another method or methods of communication.

Usage of the payment card 105 may require verification of a user identity. One method of verifying the user identity includes having the user inputting a passcode entry and verified the passcode entry against an authentic passcode stored on a remote computer system or on the payment card 105. For example, the electronic device 102 can display a passcode entry interface 112 on a touchscreen 114 of the electronic device 102. When the user inputs each character entry 116, the passcode entry interface 112 can implement a variety of security mechanisms to prevent an onlooker from stealing the passcode composition. As an example, character labels on buttons of the passcode entry interface are shown to be scrambled out of sequence as a security mechanism. Specifics of these various security mechanisms are described below.

Once the payment card 105 and the user identity are verified through the passcode entry interface 112, the electronic device 102 may facilitate the completion of financial transaction.

Figure 2:
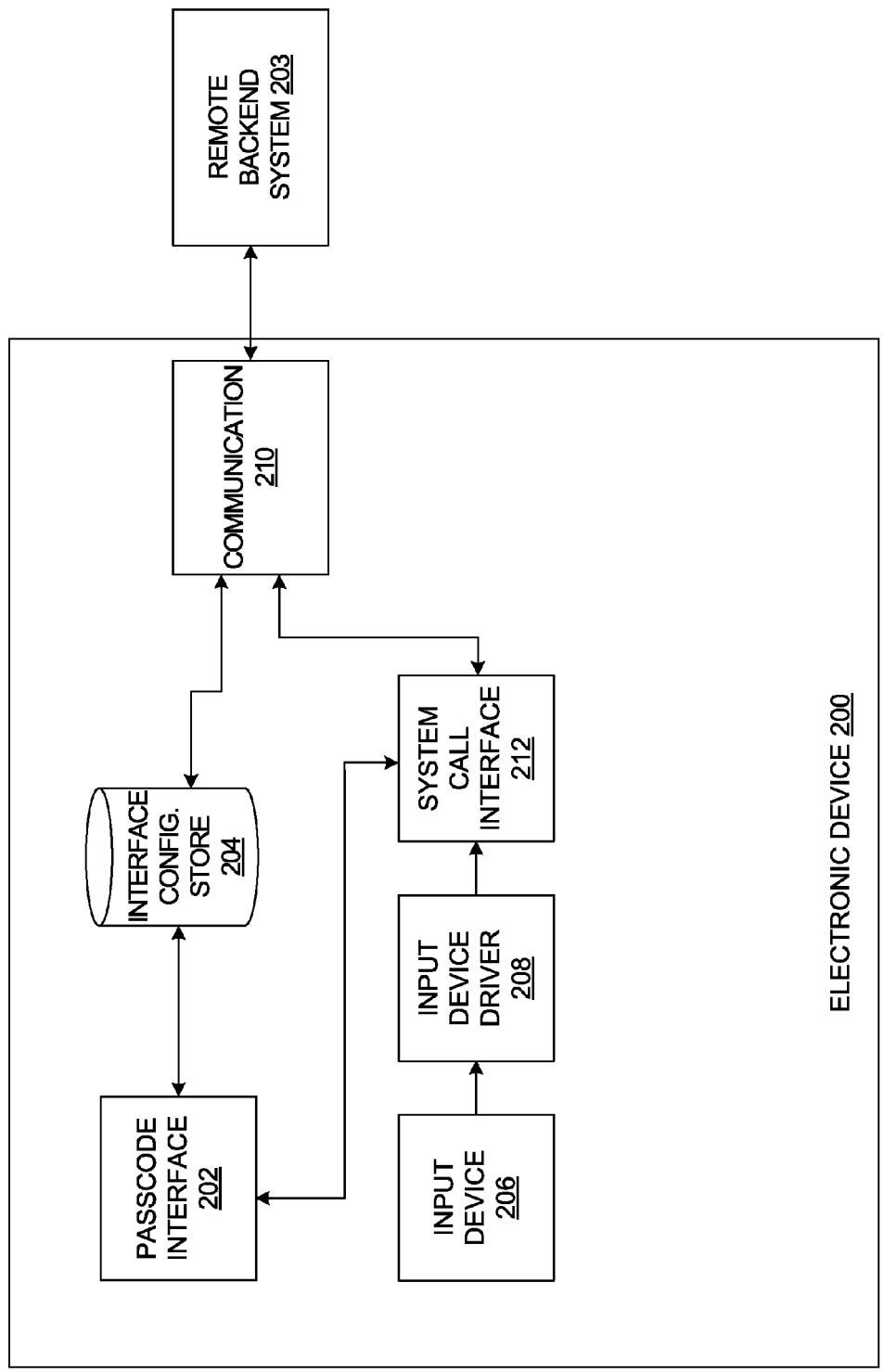
FIG. 2 is a block diagram illustrating an electronic device for passcode entry.

FIG. 2 is a block diagram illustrating an electronic device 200, which may represent the electronic device 102, for passcode entry. The electronic device 200 may be a general-purpose computing device. The electronic device 200 includes a passcode interface module 202, which is configured to present and maintain a passcode entry interface.

In various embodiments, the passcode interface module 202 is configured to generate the passcode interface. The passcode interface module 202 may generate the passcode interface in accordance with various security mechanisms described below. Each security mechanism, for example, may configure the passcode entry interface including adjusting a layout of the passcode entry interface. Such configurations are stored as a passcode interface configuration. The size, arrangement, position, orientation, shape, and other absolute or relative geometric characteristics of the passcode interface and elements within the passcode interface are all examples of the passcode interface configuration. Various passcode interface configurations may be selected to promote concealment of a user's entry of a passcode on the passcode entry interface.

In one embodiment, the passcode entry interface includes buttons corresponding to character options for composing a passcode entry. In other embodiments, the passcode entry interface includes a character selection reel, which is configured to toggle amongst different character options for composing a passcode entry. The passcode interface configuration may indicate different shapes, size, arrangement, or other geometric characteristics for the passcode entry interface.

The passcode interface configuration may also indicate various interactions and/or animation of the passcode entry interface in response to user interactions. For example, the passcode entry interface includes at least a mechanism for registering a character entry, that is, a selection by a user of a particular character option as being part of the passcode entry.

In other embodiments, the passcode interface configuration is provided by a remote backend system 203 through a network, and the passcode interface is generated and displayed based on the passcode interface configuration from the remote backend system 203. In those embodiments, once received, the passcode interface configuration is stored in an interface configuration store 204. The passcode interface configuration may then be used by the passcode interface module 202 to present the passcode interface to the user.

The passcode interface module 202 may further be configured to present the passcode interface in a variety of ways. As an example, the presentation of the passcode interface may include displaying or rendering the passcode interface on a touchscreen in accordance with the passcode interface configuration, such as a layout configuration. The passcode interface module 202 may render the passcode interface in a two-dimensional or three-dimensional manner. The passcode interface module 202 may also present the passcode interface in other ways, including presenting the passcode interface through animation, audio, webpage, widget, other passive or interactive multimedia, or any combination thereof.

The passcode interface module 202 may be configured to maintain feedback based on an interactivity between the passcode interface and a user. For example, the passcode interface module 202 may be coupled to a touchscreen of the electronic device 200, such as the touchscreen 108 of FIG. 1. The interactivity enables the passcode interface to provide feedback as a user enters a character or a set of characters to be part of the passcode entry.

A record of interactivity is captured with an input device 206, such as the touchscreen 114 of FIG. 1 or an external device coupled to the electronic device 200. The input device 206 is controlled by an input device driver 208 of the electronic device 200. The input device driver 208 may run on a kernel level of an operating system of the electronic device 200.

In various embodiments, the input device driver 208 captures an input stream from the input device 206. The input device 206 may include any input hardware (i.e., one or more sensors) capable of detecting an sensor entry which implicates (i.e., indicative of) a user's interaction with the passcode interface. Such user interactions indicate a passcode entry by the user. The sequence of sensor entries received may constitute the input stream.

A communication module 210 is configured to request a sensor input stream from a system call interface module 212 of the electronic device 200. The system call interface module 212 may be part of an operating system kernel of the electronic device 200. The system call interface module 212 may respond to the request by retrieving the sensor input stream from the input device driver module 208. In various embodiments, the passcode interface module 202 is also coupled to the system call interface 212. For example, the passcode interface module 202 can track touch events interacting with elements of the passcode entry interface to update the passcode entry interface.

In response to receiving the sensor input stream, the communication module 210 may be configured to send a portion of the sensor input stream to the remote backend system 203, such as an authentication system or a financial service system, through a network. The portion may be selected from sensor entries recorded while presenting the passcode interface on the electronic device 200.

When the passcode interface configuration is generated on the electronic device 200, the communication module 210 may transmit the passcode interface configuration to the remote backend system 203 such that the remote backend system 203 may use a portion of a sensor input stream and the passcode interface configuration to decipher the passcode entry by the user. In other embodiments, the deciphering of the passcode entry by the user is performed on the electronic device 200.

Blocks, components, and/or modules associated with the electronic device 200 may be implemented in the form of special-purpose circuitry, or in the form of one or more appropriately programmed programmable processors, or a combination thereof. For example, the modules described can be implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via communication modules to coordinate its operations via an interconnect or wirelessly. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The electronic device 200 may include additional, fewer, or different modules for various applications. Some functionalities or modules of the electronic device 200 may instead by implemented on the remote backend system 203, such as the interpretation of the touch events and/or the generation of the passcode interface configuration files.

The interface configuration store 204 described may be implemented in one or more hardware memory components or portions of the hardware memory components. The interface configuration store 204 may be implemented as a dynamic database service or a static data structure. The store can be implemented by a single physical device or distributed through multiple physical devices. The storage space of the store can be allocated at run-time of the modules described above, such as the passcode interface module 202.

Figure 3:
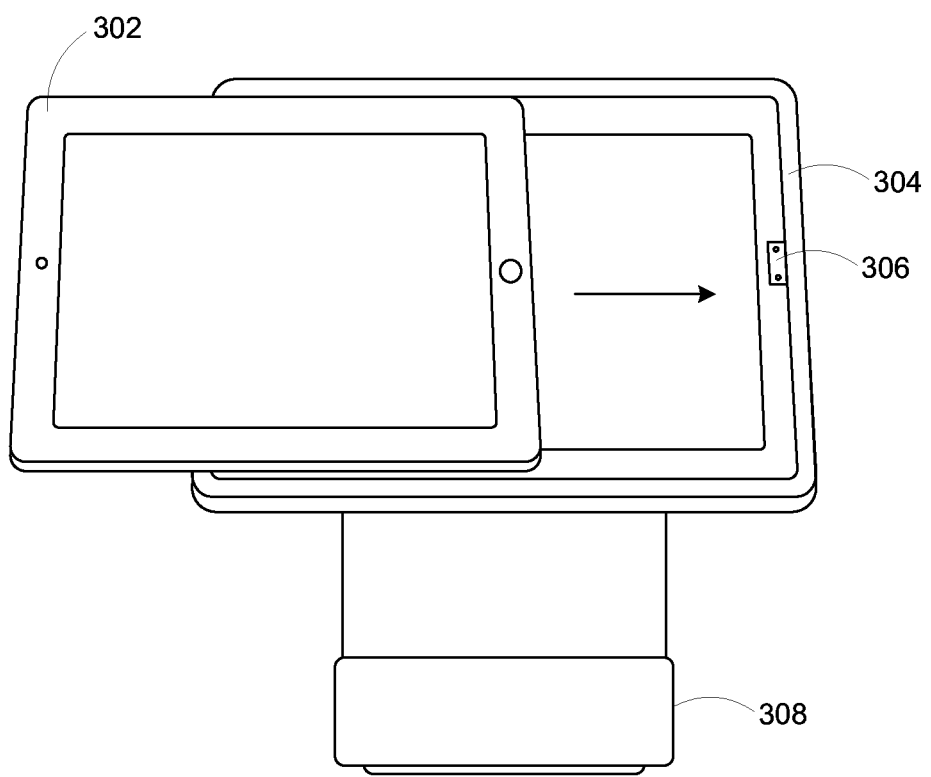
FIG. 3 is a diagram illustrating an electronic device coupled to a docking station.

FIG. 3 is a diagram illustrating an electronic device 302, such as the electronic device 102 or the electronic device 200, coupled to a docking station 304, such as the docking station 106. As shown, the electronic device 302 is detachably connectable to the docking station 304 via a connector 306. Once connected, the electronic device 302 may fit in a cavity in a frame of the docking station 106. The docking station 106 includes a card reader 308, such as the card reader 104.

Figure 4:
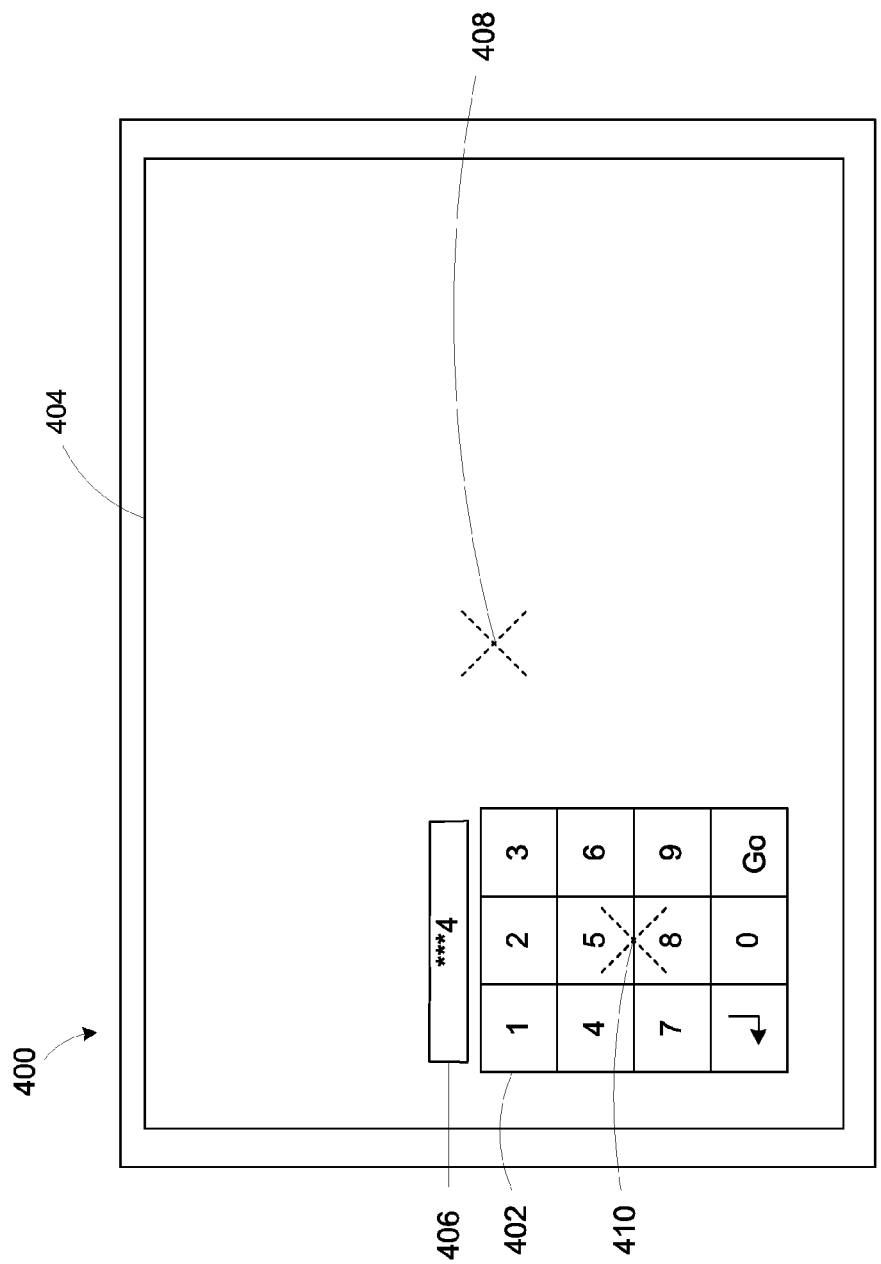
FIG. 4 illustrates an electronic device displaying a passcode entry interface at a corner of a touchscreen.

FIG. 4 illustrates an electronic device 400, such as the electronic device 102 or the electronic device 200, displaying a passcode entry interface 402 at a corner of a touchscreen 404, such as the touchscreen 114. The passcode entry interface 402 may be the passcode entry interface 112. The passcode entry interface 402 may be generated by the passcode interface module 202. Optionally, the touchscreen 404 may display a feedback window 406, which is configured to display the most recent character entry through the passcode entry interface 402 and/or how many character entries have been made to compose a passcode entry.

As shown, the passcode entry interface 402 may be positioned off-center from a touchscreen center point 408 of the touchscreen 404. That is, the touchscreen center point 408 is substantially spaced apart from an interface center point 410. The off-center positioning, such as positioning the passcode entry interface 402 at a corner of the touchscreen 404, is advantageous by allowing a user inputting through the passcode entry interface 402 to shield the passcode entry interface 402 with his or her hand, such as by cupping the passcode entry interface 402 with the hand. The off-center positioning of the passcode entry interface 402 may be in accordance with various embodiments described herein, such as passcode entry interfaces with various button arrangements, geometries, adornments, and/or interaction mechanisms.

Figure 5B:
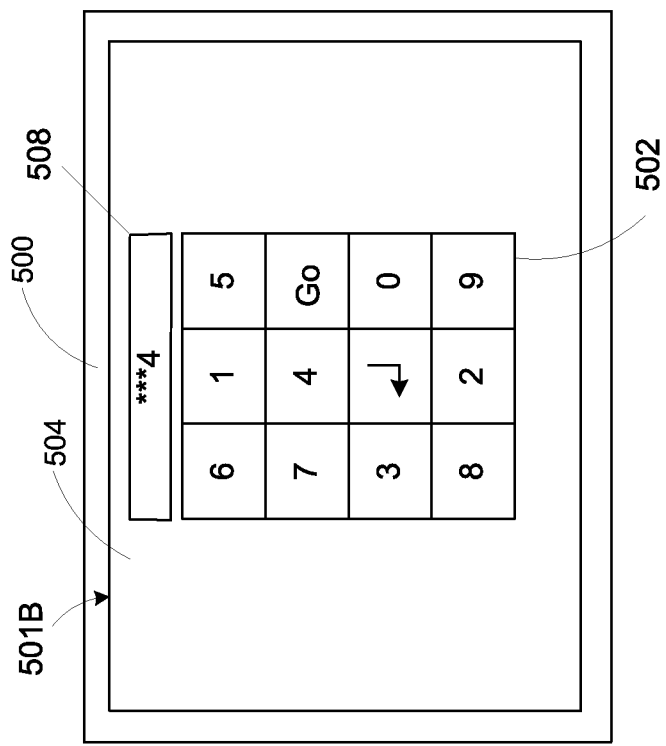
FIG. 5B illustrates the electronic device of FIG. 5A displaying the passcode entry interface on the touchscreen with the buttons of the passcode entry interface rearranged in response to a touch on the touchscreen.
Figure 5A:
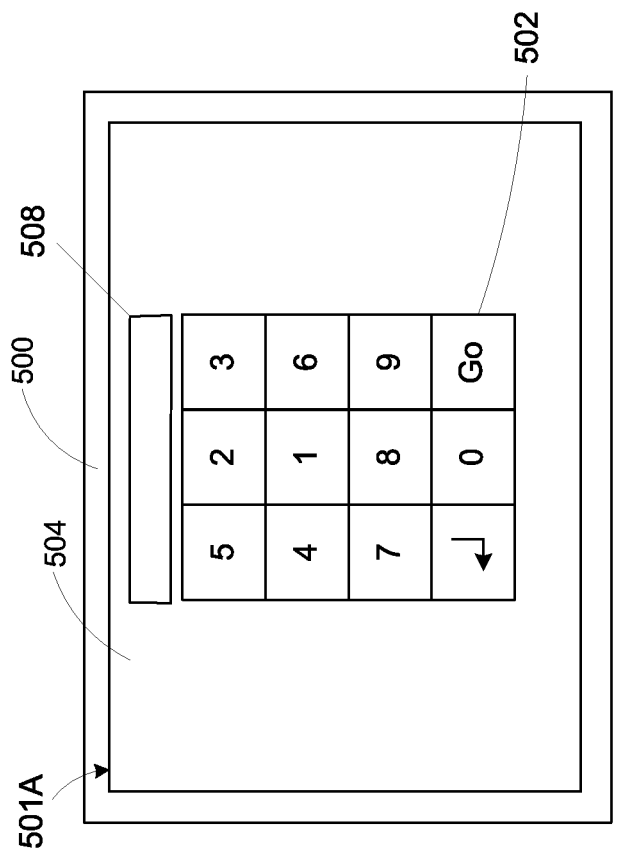
FIG. 5A illustrates an electronic device displaying a first screenshot including a passcode entry interface on a touchscreen with buttons of the passcode entry interface displayed out of sequence.

FIG. 5A illustrates an electronic device 500 displaying a first screenshot 501A including a passcode entry interface 502, such as the passcode entry interface 112, on a touchscreen 504 with buttons 506 of the passcode entry interface 502 displayed out of sequence from a natural sequence of the character options (e.g., numeric sequence or alphabetical sequence). For example, the natural sequence of numeric digits can include a count from "0" incrementally to "9" or a count from "1" incrementally to "9" and ending in "0".

The electronic device 500 may be the electronic device 102 or the electronic device 200. The passcode entry interface 502 may be generated and displayed by the passcode interface module 202. As shown, the buttons 506 are each labeled by a corresponding character option for composing a passcode entry. For example, the buttons 506 are shown to be label by numeric digits from zero to nine. Optionally, the touchscreen 504 may display a feedback window 508, which is configured to display the most recent character entry through the passcode entry interface 502 and/or how many character entries have been made to compose a passcode entry.

In various embodiments, the initial state is arranged such that the buttons 506 are in-sequence. In other embodiments, as shown, the initial state is arranged such that the buttons 506 are out of sequence. For example, the first screenshot 501A may be represented as an initial state of the passcode entry interface 502, illustrating the buttons 506 arranged out of sequence.

A conventional passcode entry interface arranges the buttons 506 in accordance with an alphabetical or numerical order. For example, in the passcode entry interface 112 and the passcode entry interface 402, the buttons are illustrated as arranged in numerical order (e.g., ordered as horizontal lines from "1" to "9" with"0" considered as after "9"). In contrast, the passcode entry interface 502 arranges the buttons 506 out of its numerical sequence. The passcode entry interface 502 may be arranged at random. Fixed positions for buttons may be assigned on the passcode entry interface 502, where each button with a specific character assignment is randomized.

FIG. 5B illustrates the electronic device 500 of FIG. 5A displaying a second screenshot 501B including the passcode entry interface 502 on the touchscreen 504 with the buttons 506 of the passcode entry interface 502 rearranged in response to a touch on the touchscreen 504. The second screenshot 501B may be part of a screen sequence illustrating the buttons 506 arranged out of sequence and different from the arrangement in the first screenshot 501A. The second screenshot 520 represents a subsequent state of the passcode entry interface 502 after a character entry has already been made. For example, in response to a touch event over one of the buttons 506 on the touchscreen 504, the electronic device 500 can rearrange the buttons 506 on the passcode entry interface 502. The out of sequence arrangement and rearrangement of the passcode entry interface 502 may be in accordance with various embodiments described herein, such as passcode entry interfaces with various button arrangements, positioning, geometries, adornments, and/or interaction mechanisms.

Figure 6:
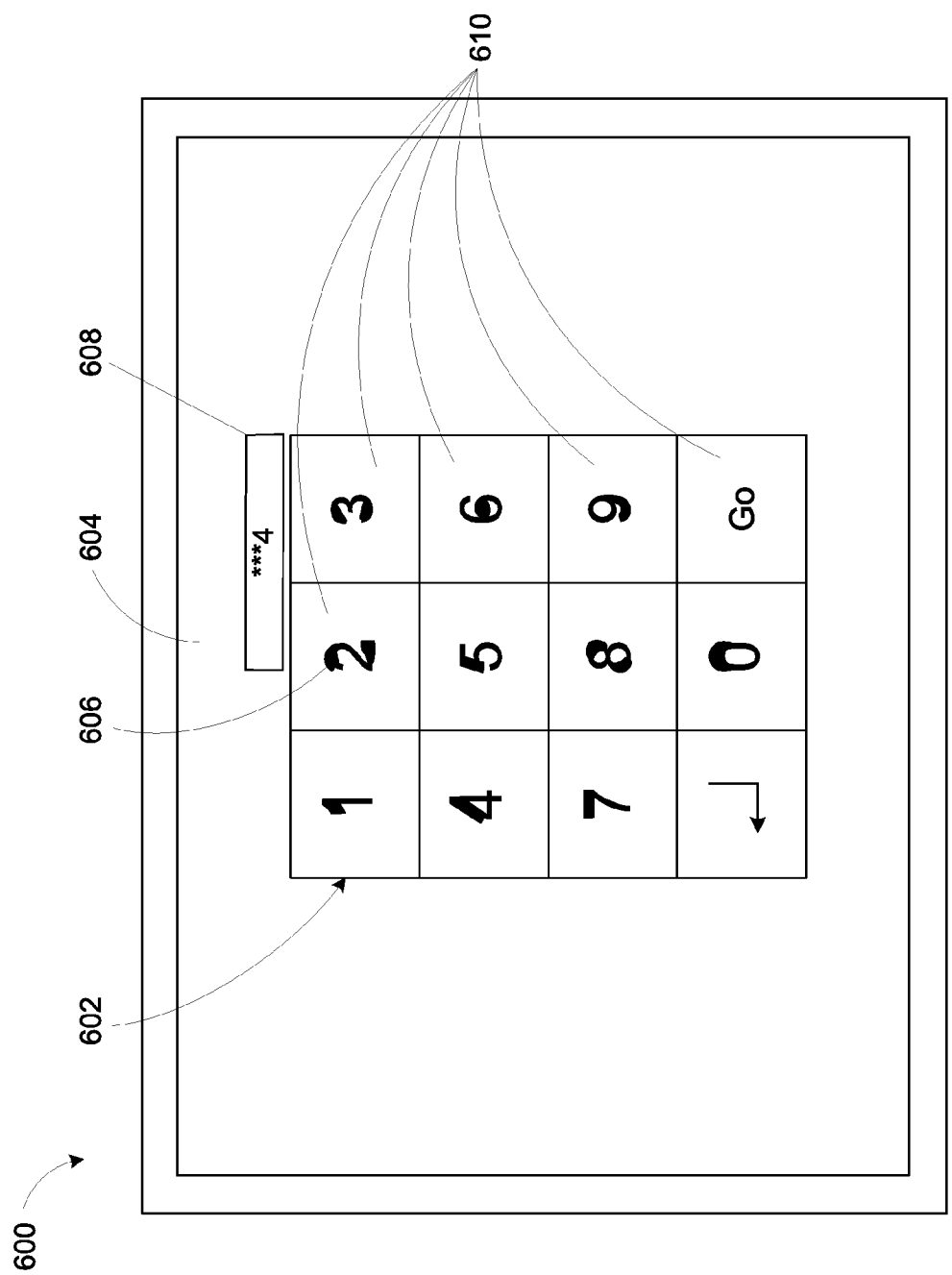
FIG. 6 illustrates an electronic device displaying a passcode entry interface on a touchscreen with stroke width variations on each character label of the passcode entry interface.

FIG. 6 illustrates an electronic device 600 displaying a passcode entry interface 602, such as the passcode entry interface 112, on a touchscreen 604, such as the touchscreen 114, with stroke width variations on each character label 606 of the passcode entry interface 602. The electronic device 600 may represent the electronic device 102 or the electronic device 200. The passcode entry interface 602 may be generated and displayed by the passcode interface module 202. Optionally, the touchscreen 604 may display a feedback window 608, which is configured to display the most recent character entry through the passcode entry interface 602 and/or how many character entries have been made to compose a passcode entry.

As shown, the passcode entry interface 602 includes buttons 610. Each of the buttons 610 may include a character label 606. The character label 606 displays a visual representation of a character option, corresponding to each button 610, for composing a passcode entry. For example, the character label 606 may be a visual display of the numeric digit "2." The electronic device 600 may render the character label 606 having stroke width variations therein. That is, pixel density within the character label 606 is varied against conventional standards for the corresponding character option. The stroke width variations may be exaggerated up to the point where the character label 606 is recognizable at a close distance within an arm's length, but unrecognizable at a distance beyond the arm's length or at an angle substantially parallel to the touchscreen 604. The stroke width variations of the character label 606 on the passcode entry interface 602 may be in accordance with various embodiments described herein, such as passcode entry interfaces with various button arrangements, positioning, geometries, adornments, and/or interaction mechanisms.

Figure 7:
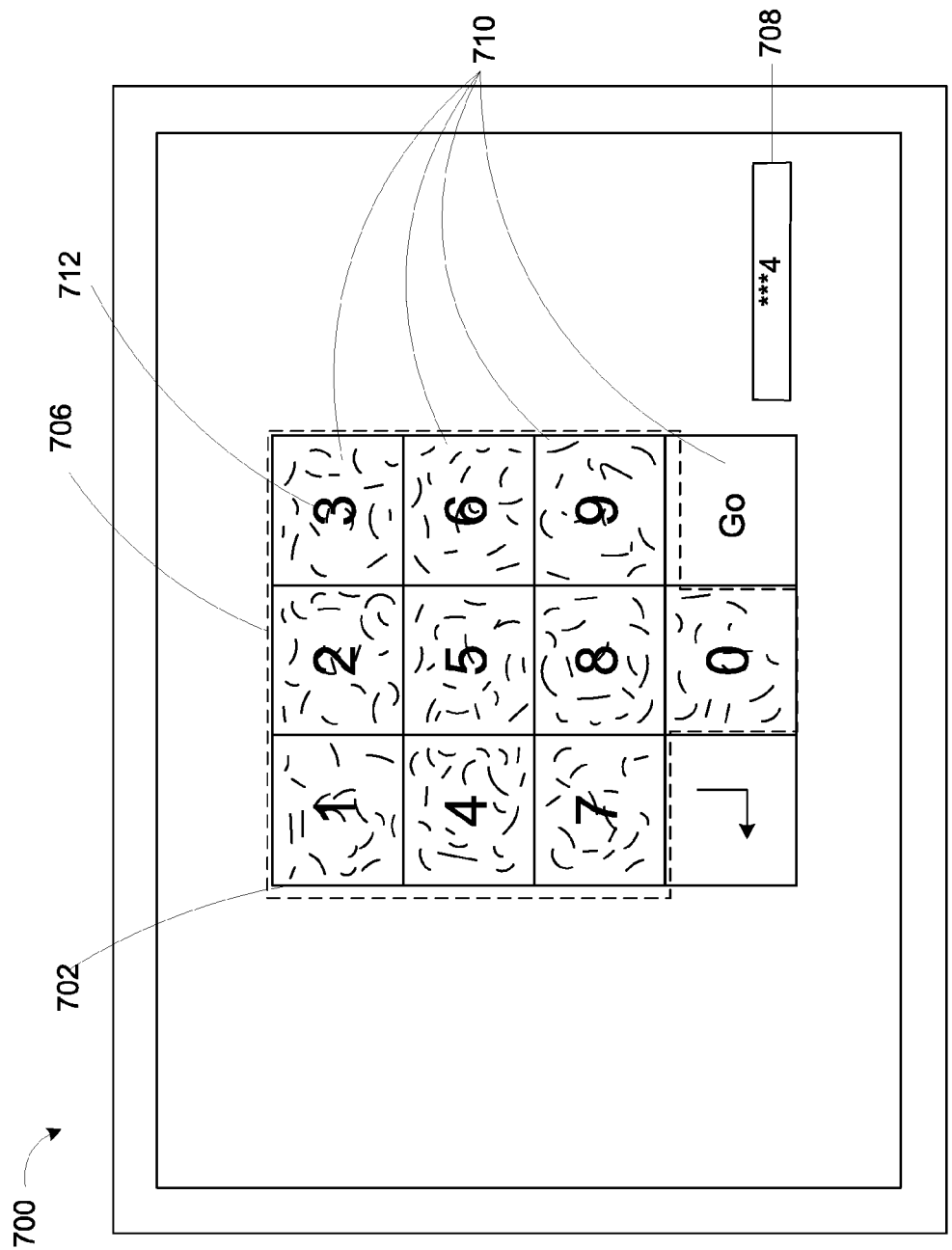
FIG. 7 illustrates an electronic device displaying a passcode entry interface on a touchscreen with the passcode entry interface covered by a concealment layer.

FIG. 7 illustrates an electronic device 700 displaying a passcode entry interface 702, such as the passcode entry interface 112, on a touchscreen 704, such as the touchscreen 114, with the passcode entry interface 702 covered by a concealment layer 706. The electronic device 700 may represent the electronic device 102 or the electronic device 200. The passcode entry interface 702 may be generated and displayed by the passcode interface module 202. Optionally, the touchscreen 704 may display a feedback window 708, which is configured to display the most recent character entry through the passcode entry interface 702 and/or how many character entries have been made to compose a passcode entry.

As shown, the passcode entry interface 702 includes buttons 710. Each of the buttons 710 may include a character label 712. The character label 712 displays a visual representation of a character option, corresponding to each button 710, for composing a passcode entry. For example, the character label 712 can be a visual display of the numeric digit "3." The concealment layer 706 includes a distribution of visual obstructions, such as blots, line segments (e.g., straight, curved or wavy), spots, stains, blemishes, other low-density geometries, or any combination thereof. The visual obstructions may be distributed randomly or follow a linear or two dimensional pattern. The visual obstructions may be aligned over each of the buttons 710. The concealment layer 706 may reveal (i.e., by absence of the visual obstructions) some of the buttons 710 that are functional elements of the passcode entry interface 702, such as back arrow button and the "GO" button. The concealment layer 706 over the passcode entry interface 702 may be in accordance with various embodiments described herein, such as passcode entry interfaces with various button arrangements, positioning, geometries, adornments, and/or interaction mechanisms.

Figure 8A:
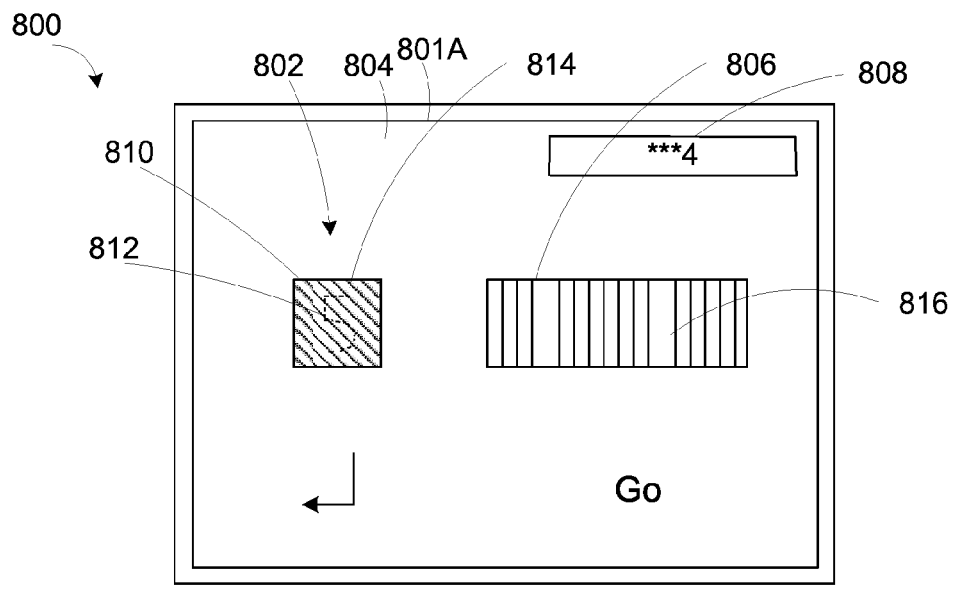
FIG. 8A illustrates an electronic device displaying a first screenshot including a passcode entry interface on a touchscreen with a line moiré region sliding over the passcode entry interface.

FIG. 8A illustrates an electronic device 800 displaying a first screenshot 801A including a passcode entry interface 802, such as the passcode entry interface 112, on a touchscreen 804, such as the touchscreen 114, with a line moiré region 806 sliding over the passcode entry interface 802. The electronic device 800 may represent the electronic device 102 or the electronic device 200. The passcode entry interface 802 may be generated and displayed by the passcode interface module 202. Optionally, the touchscreen 804 may display a feedback window 808, which is configured to display the most recent character entry through the passcode entry interface 802 and/or how many character entries have been made to compose a passcode entry.

As shown, the passcode entry interface 802 includes a button 810 with a character label 812 displayed thereon. The button 810 is fashioned with a first line moiré pattern 814 having the character label 812 disguised in the first line moiré pattern 814. For illustrative purposes, only a single button is shown. However, the passcode entry interface 802 may include other buttons as well.

The line moiré region 806 may be a geometric shape displayed on the touchscreen 804 that is filled with a second line moiré pattern 816. The line moiré region 806 may slide over the button 810. For example, the sliding may be in response to a swipe gesture over the line moiré region 806 or based on a scheduled animation by the electronic device 800.

Figure 8B:
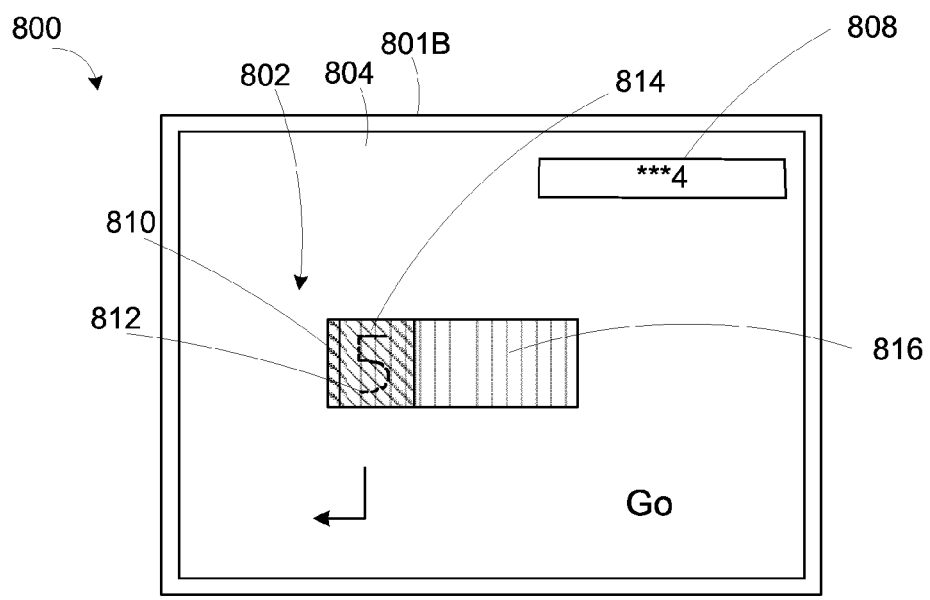
FIG. 8B illustrates the electronic device of FIG. 8A displaying a second screenshot including the passcode entry interface on the touchscreen device with the line moiré region covering part of the passcode entry interface.

FIG. 8B illustrates the electronic device 800 of FIG. 8A displaying a second screenshot 801B including the passcode entry interface 802 on the touchscreen device 804 with the line moiré region 802 covering part of the passcode entry interface 800. When the first line moiré pattern 814 and the second line moiré pattern 816 overlap, the character label 812 is shown to be revealed. The concealing and revealing of the character label 812 through the sliding line moiré region 806 over the passcode entry interface 802 may be in accordance with various embodiments described herein, such as passcode entry interfaces with various button arrangements, positioning, geometries, adornments, and/or interaction mechanisms.

Figure 9B:
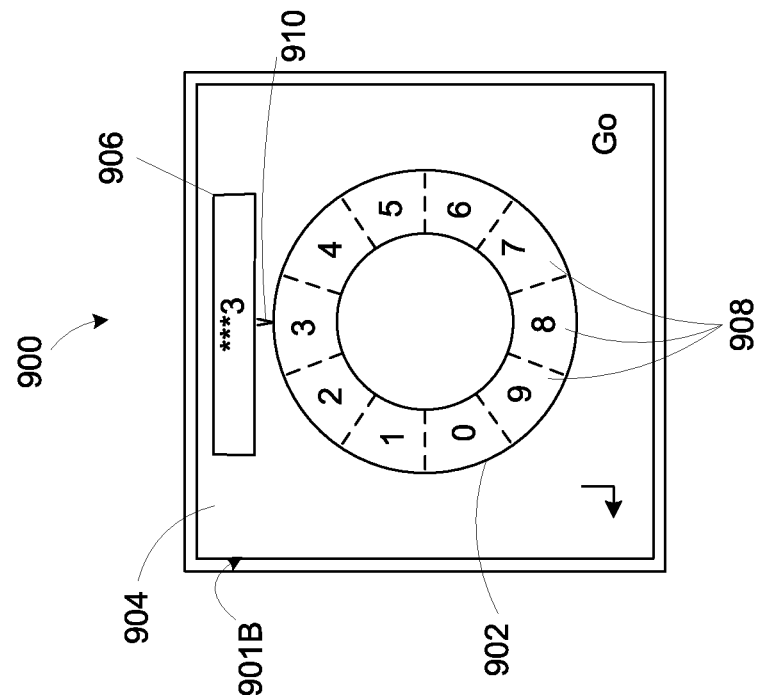
FIG. 9B illustrates the electronic device of FIG. 9A displaying a second screenshot with the passcode entry interface of FIG. 9A rotated in response to a touch on the touchscreen.
Figure 9A:
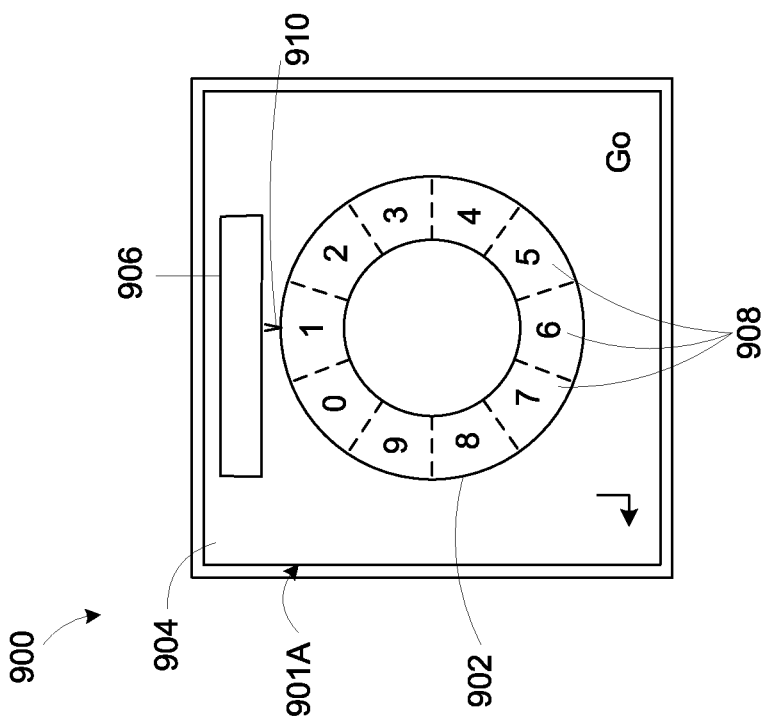
FIG. 9A illustrates an electronic device displaying a first screenshot including a passcode entry interface shaped in a loop pattern on a touchscreen.

FIG. 9A illustrates an electronic device 900 displaying a first screenshot 901A including a passcode entry interface 902, such as the passcode entry interface 112, shaped in a loop pattern on a touchscreen 904, such as the touchscreen 114. The electronic device 900 may represent the electronic device 102 or the electronic device 200. The passcode entry interface 902 may be generated and displayed by the passcode interface module 202. Optionally, the touchscreen 904 may display a feedback window 906, which is configured to display the most recent character entry through the passcode entry interface 902 and/or how many character entries have been made to compose a passcode entry.

As shown, the passcode entry interface 902 may be shaped as a ring with buttons 908 distributed evenly and radially. Each button 908 may correspond with a character option for composing a passcode entry. A character entry by a user may be recorded on the passcode entry interface 902 by, for example, the electronic device 900 detecting a touch event over one of the buttons 908.

Alternatively, the passcode entry interface 902 may be implemented similar to a rotary dial phone, where a circular/elliptical motion gesture on the touchscreen 904 rotates the passcode entry interface 902. As a user rotates the passcode entry interface now to, a fixed point 910 tangential to the passcode entry interface 902 may indicate which character the user has selected. When the circular/elliptical motion gesture and, the button closest to the fixed point 910 may be appended to the construction of the passcode entry.

In various embodiments, the electronic device 900 generates an initial state of the passcode entry interface 902 with a randomized rotation while keeping the characters represented by the buttons 908 in sequence (e.g., in numeric sequence or in alphabetical sequence). The randomized rotation is advantageous because an onlooker looking over the shoulder of the user cannot approximate which character the user has entered based on the location of the user's finger. On the other hand, the characters represented by the buttons 908 remains in sequence and in symmetry. For example, any pair of characters across from each other remains in the same relative position. In some embodiments, the characters represented by the buttons 908 are completely randomized or randomized with the constraint that pairs of characters across from each other remains the same as when the characters are in sequence.

FIG. 9B illustrates the electronic device 900 of FIG. 9A displaying a second screenshot 901B with the passcode entry interface 902 rotated in response to a touch on the touchscreen 904. The second screenshot 901B may represent the passcode entry interface 902 in response to a prior character entry, such as a touch event over one of the buttons 908. The passcode entry interface 902 may be rotated in response to a prior character entry. The passcode entry interface 902 may be randomly rotated or rotated based on a determined pattern. The passcode entry interface 902 shaped in a loop pattern may be in accordance with various embodiments described herein, such as passcode entry interfaces with various button arrangements, positioning, geometries, adornments, and/or interaction mechanisms.

Figure 10:
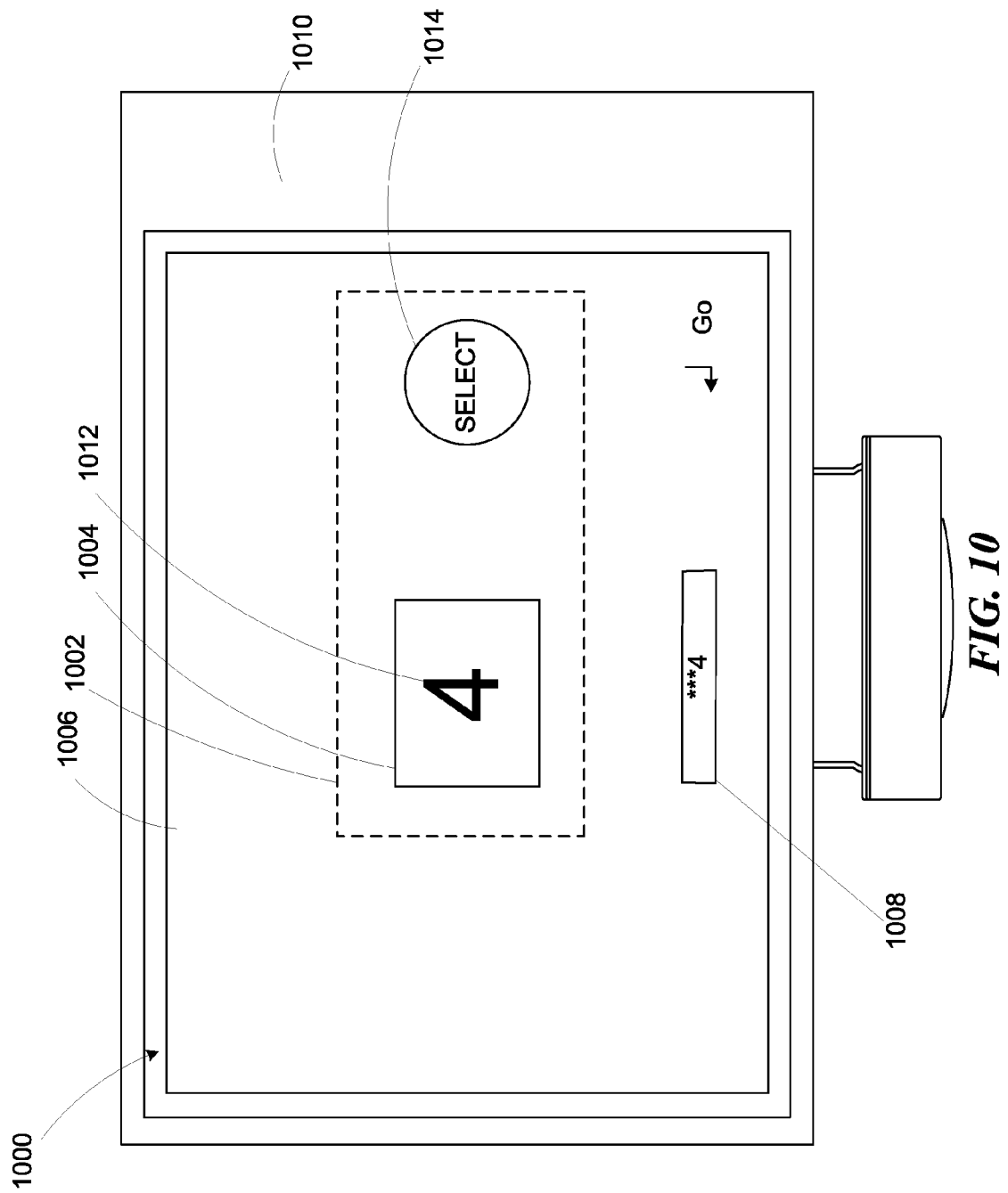
FIG. 10 illustrates an electronic device displaying a passcode entry interface with a character selection reel on a touchscreen.

FIG. 10 illustrates an electronic device 1000 displaying a passcode entry interface 1002, such as the passcode entry interface 112, with a character selection reel 1004 on a touchscreen 1006, such as the touchscreen 114. The electronic device 1000 may represent the electronic device 102 or the electronic device 200. The passcode entry interface 1002 may be generated and displayed by the passcode interface module 202. Optionally, the touchscreen 1006 may display a feedback window 1008, which is configured to display the most recent character entry through the passcode entry interface 1002 and/or how many character entries have been made to compose a passcode entry. The electronic device 1000 is illustrated to be coupled with a docking station 1010, such as the docking station 106. The passcode entry interface 1002 can operate without the docking station 1010, and the docking station 1010 is illustrated only for comparison purposes with FIGS. 11-13.

In various embodiments, the passcode entry interface 1002 includes one or more of the character selection reel 1004. The character selection reel 1004 may be displayed as a window displaying a single character label 1012. The character selection reel 1004 is associated with character options for composing a passcode entry. The character options may be structured as an invisible/virtual list with the window of the character selection reel 1004 revealing the single character label 1012 from the character options. The character selection reel 1004 may be responsive to one or more user input mechanisms for switching amongst the character options. For example, the character selection reel 1004 may be responsive to a swiping gesture detected over the character selection reel 1004. The swiping gesture triggers switching a selection from amongst the character options, such as up and down through the vertical list of the character options.

The single character label 1012 displayed by the character selection reel 1004 can be selected, such as by pressing of a selection button 1014 on the touchscreen 1006. The selection button 1014 may be a standalone button with its own label or a transparent button overlay on top of the character selection reel 1004. The passcode entry interface 1002 with the character selection reel 1004 may be in accordance with various embodiments described herein, such as passcode entry interfaces with various button arrangements, positioning, geometries, adornments, and/or interaction mechanisms.

Figure 11A:
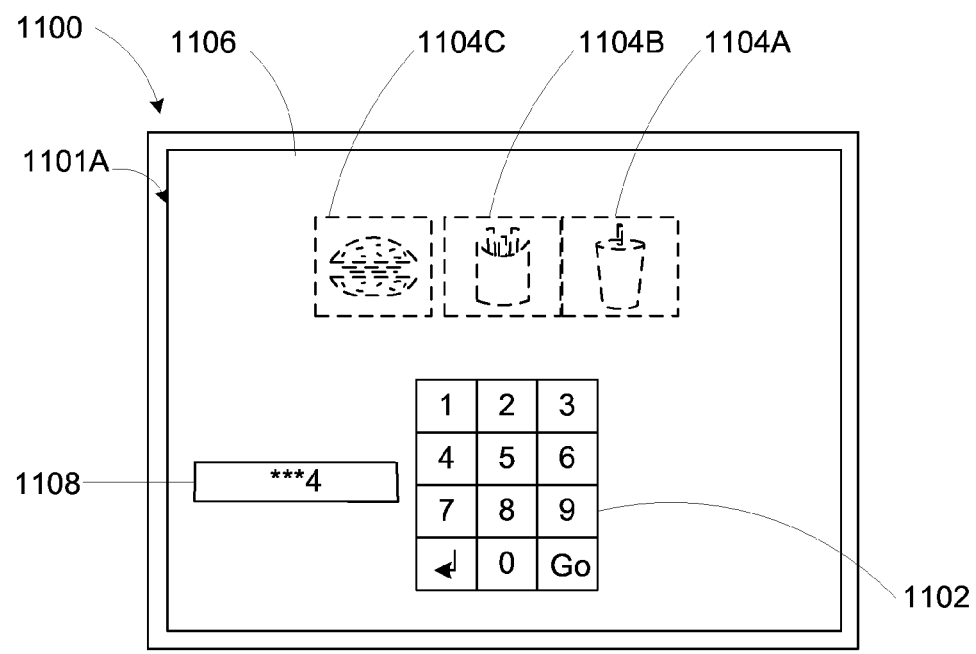
FIG. 11A illustrates an electronic device displaying a first screenshot including a passcode entry interface and a storefront interface element on a touchscreen.

FIG. 11A illustrates an electronic device 1100 displaying a first screenshot 1101A including a passcode entry interface 1102, such as the passcode entry interface 112 of FIG. 1, and a storefront interface element 1104 on a touchscreen 1106, such as the touchscreen 114. The electronic device 1100 may represent the electronic device 102 or the electronic device 200. The passcode entry interface 1102 may be generated and displayed by the passcode interface module 202. Optionally, the touchscreen 1106 may display a feedback window 1108, which is configured to display the most recent character entry through the passcode entry interface 1102 and/or how many character entries have been made to compose a passcode entry.

The electronic device 1100 can display the storefront interface element 1104 (illustrated as dashed lines, such as menu element 1104A, menu element 1104B, and menu element 1104C collectively referred to as "1104") as part of a first user session of a payment checkout application. In various embodiments, the electronic device 1100 can display the storefront interface elements 1104 prior to displaying the passcode entry interface 1102. In other embodiments, the electronic device 1100 can display the storefront interface elements 1104 at the same time as displaying the passcode entry interface 1102. As shown, the storefront interface element 1104 occupies a different region of the touchscreen 1106 as compared to the passcode entry interface 1102.

Figure 11B:
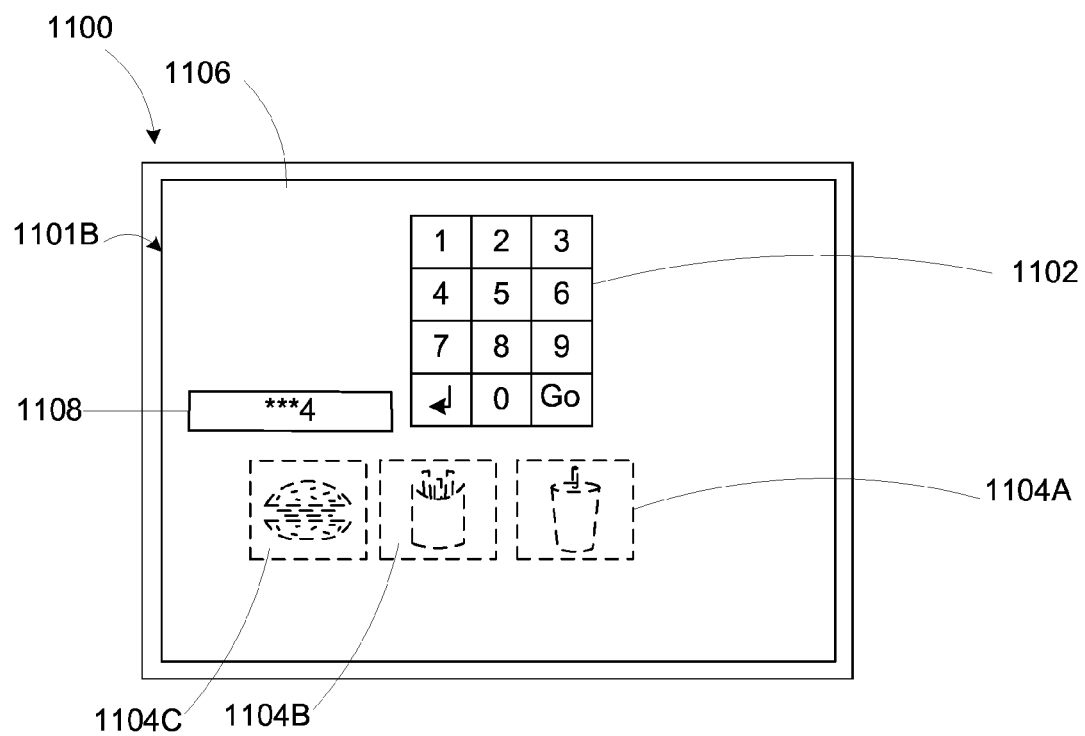
FIG. 11B illustrates the electronic device of FIG. 11A displaying a second screenshot on the touchscreen with positions of the passcode entry interface and the storefront interface element alternated.

FIG. 11B illustrates the electronic device 1100 of FIG. 11A displaying is a second screenshot 1101B on the touchscreen 1106 with positions of the passcode entry interface 1102 and the storefront interface element 1104 alternated. The second screenshot 1101B illustrates a second user session of the payment checkout application. As shown, the electronic device 1100 alternates the positions of the passcode entry interface 1102 and the storefront interface element 1104 from the first user session to the second user session. This is advantageous in distributing fingerprints on the touchscreen 1106 from one user session to another, says preventing someone from reverse engineering the passcode entry through fingerprint analysis.

Figure 12A:
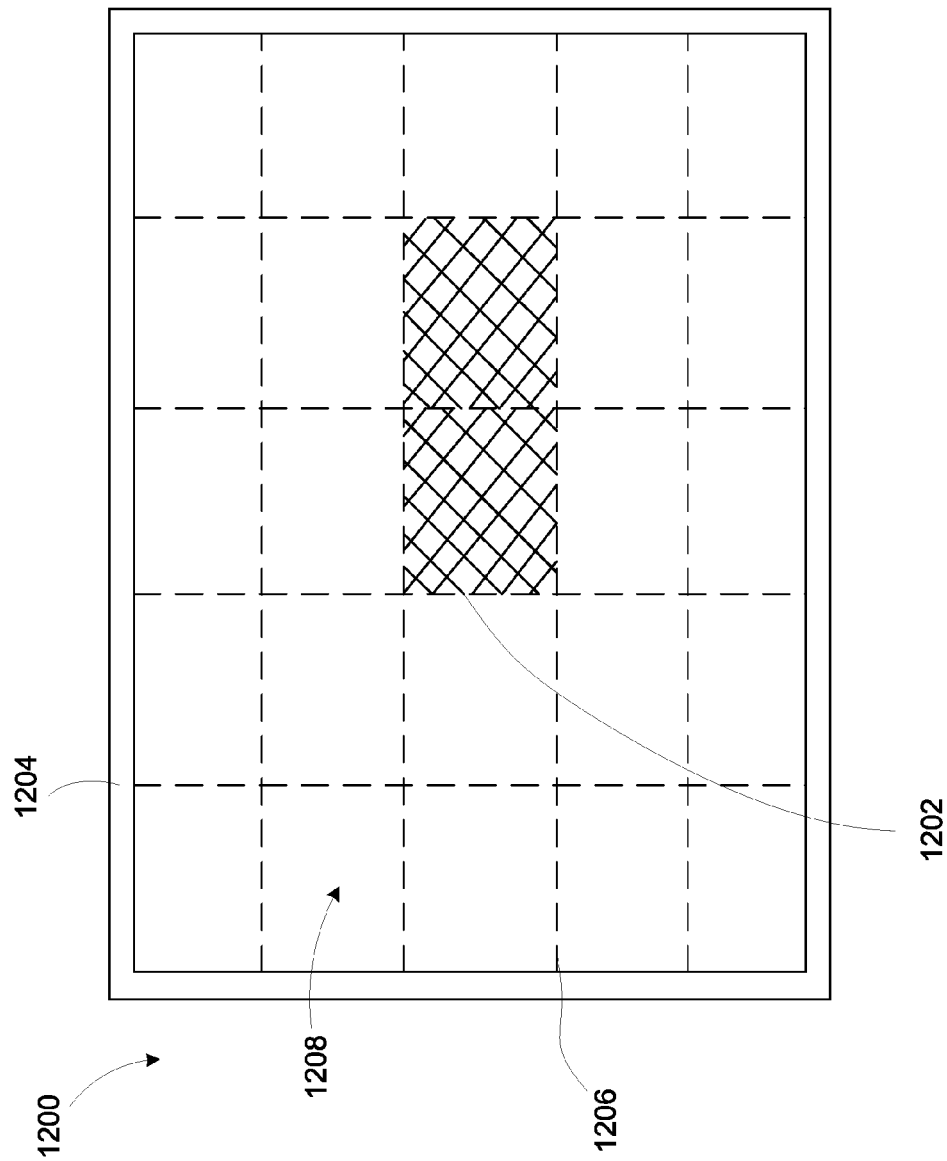
FIG. 12A illustrates an electronic device identifying a finger touch traffic region on a touchscreen.

This technique of alternating positions of the passcode entry interface 1102 and a second interface may be apply outside of the context of the storefront interface elements 1104. That is, this technique may apply to any application where the second interface is presented on the same touchscreen 1106 during a user session of operating the application. The alternating of positions may applies to any other time periods other than user sessions, such as periodically or conditional on a number of touch events recorded on the touchscreen 1106. The passcode entry interface 1102 may be in accordance with various embodiments described herein, such as passcode entry interfaces with various button arrangements, positioning, geometries, adornments, and/or interaction mechanisms FIG. 12A illustrates an electronic device 1200 identifying a finger touch traffic region 1202 on a touchscreen 1204, such as the touchscreen 114. The electronic device 1200 may represent the electronic device 102 or the electronic device 200. The finger touch traffic region 1202 may be determined by the passcode interface module 202. For example, the electronic device 1200 can keep track of touch events on the touchscreen 1204. The touch events may be in response to a passcode entry interface or any other interface displayed on the touchscreen 1204. The touch events can be stored on a grid structure 1206. A touch event detected within a cell 1208 of the grid structure 1206 can increase a touch event count of the cell 1208. In various embodiments, when the cell 1208 exceeds a threshold number of touch events, the cell 1208 can be considered part of the finger touch traffic region 1202. In other embodiments, when the cell 1208 both exceeds a threshold number of touch events and has a rank within a rank threshold as compared to other cells, then the cell 1208 can be considered part of the finger touch traffic region 1202.

In various embodiments, the electronic device 1200 can track one or more instances of finger touch traffic regions 1202. The cell 1208 may be configured as a square, a rectangle, or other geometric shapes. Likewise, the finger touch traffic region 1202 may be configured as a square, a rectangle, or other geometric shapes.

Figure 12B:
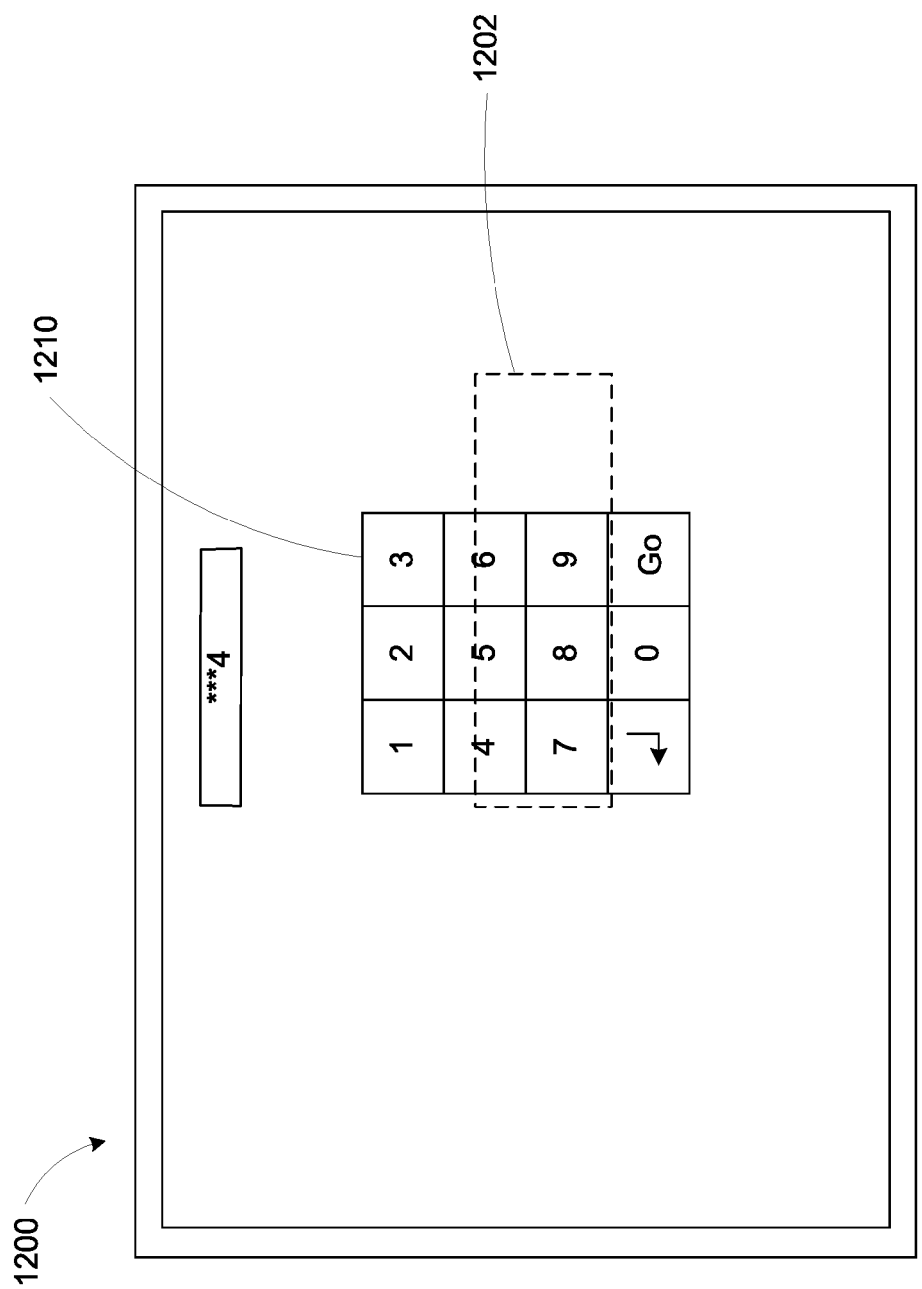
FIG. 12B illustrates the electronic device of FIG. 12A positioning a passcode entry interface over the finger touch traffic region.

FIG. 12B illustrates the electronic device 1200 of FIG. 12A positioning a passcode entry interface 1210, such as the passcode entry interface 112, over the finger touch traffic region 1202. The passcode entry interface 1210 may be generated and maintained by the passcode interface module 202. As shown, the passcode entry interface 1210 may be positioned over the finger touch traffic region 1202 as identified by the electronic device 1200 shown in FIG. 12A. In various embodiments, when the passcode entry interface 1210 does not fit in the finger touch traffic region 1202, the passcode entry interface 1210 may be positioned to maximize overlap between the finger touch traffic region 1202 and the passcode entry interface 1210. The passcode entry interface 1210 may be in accordance with various embodiments described herein, such as passcode entry interfaces with various button arrangements, positioning, geometries, adornments, and/or interaction mechanisms.

Figure 13:
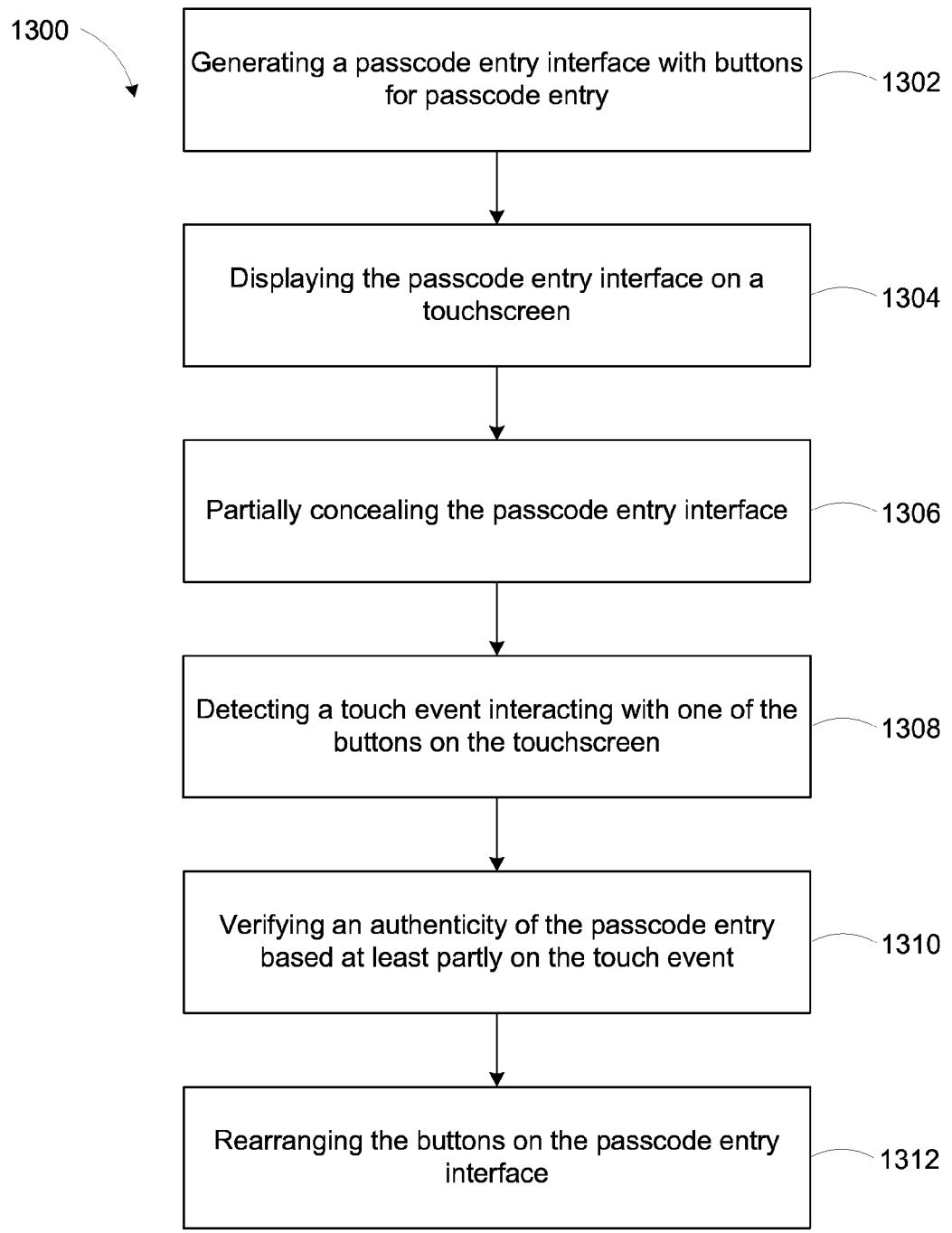
FIG. 13 is a flow chart of a process of operating an electronic device for passcode entry security.

FIG. 13 is a flow chart of a process 1300 of operating an electronic device, such as the electronic device 102 of FIG. 1 or the electronic device 200 of FIG. 2, for passcode entry security. The electronic device generates a passcode entry interface including buttons at step 1302. The passcode entry interface may be generated based on a passcode interface configuration file, such as the passcode interface configurations stored on the interface configuration store 204 of FIG. 2. The buttons may be scrambled out of sequence. The buttons correspond to and are labeled with individual characters for composing a passcode entry. The passcode entry interface may be generated by randomly arranging the buttons of the passcode entry interface. The buttons can be randomly arranged while keeping the outline shape of the passcode entry interface constant. Step 1302 may be performed by the passcode interface module 202.

In some embodiments, the electronic device generates the passcode entry interface in a loop pattern, such as a ring shape. An initial state of every instance of the passcode entry interface may include a random rotation. This is advantageous in that an overlooking attacker cannot reverse engineer a character entry by looking at the location of where a user interacts with the passcode entry interface.

As part of step 1302 or as a separate step 1304, the electronic device displays the passcode entry interface on a touchscreen of the electronic device. When displaying the passcode entry interface, the electronic device can position the passcode entry interface at a corner of the touchscreen to enable a user to cover a passcode entry with his or her hand. Step 1304 may be performed by the passcode interface module 202.

Optionally, the electronic device can conceal the passcode entry interface by visually obstructing displaying of the buttons at step 1306. For example, the electronic device can vary pixel densities (e.g., the stroke widths) within each of the characters to make the characters difficult to read at a distance. As another example, the electronic device can overlay a concealment layer over the passcode entry interface. The concealment layer may include a spray of visual obstructions, such as blots, strokes, line segments, dots, stains, or any combination thereof. In yet another example, the electronic device can label the buttons with the individual characters obscured by a first line moiré pattern. A shape with a second line moiré pattern can slide over the passcode entry interface revealing each character thereunder.

The user may interact with the passcode entry interface on the touchscreen. Thus, the electronic device can detect a touch event interacting with at least one of the buttons on the touchscreen at step 1308. Step 1308 may be performed by the input device driver 208. The electronic device verifies an authenticity of the passcode entry based at least partly on the touch event at step 1310. Step 1310 can include sending the touch event to an external system, such as the remote backend system 203 of FIG. 2. The external system can match the touch event to the passcode interface configuration to determine the passcode entry made by the user. Alternatively, the matching may be done on the electronic device. Step 1310 may be performed by the passcode interface module 202 and/or the communication module 210. Once the user confirms completion of the passcode entry, the sequence of touch events is then used for verification of the user's identity.

Optionally, in response to the touch event, the electronic device can rearrange the buttons on the passcode entry interface at step 1312. The rearrangement may be a random assignment of the characters to the buttons. The rearrangement may also be random swapping of the characters and the corresponding buttons. Where the passcode entry interface follows a loop pattern, the rearranging may include a random rotation of the buttons. In some embodiments, the buttons are rearranged without changing relative positions between pairs of the buttons. In various embodiments, the shape of the passcode entry interface remains constant during the rearranging.

Figure 14:
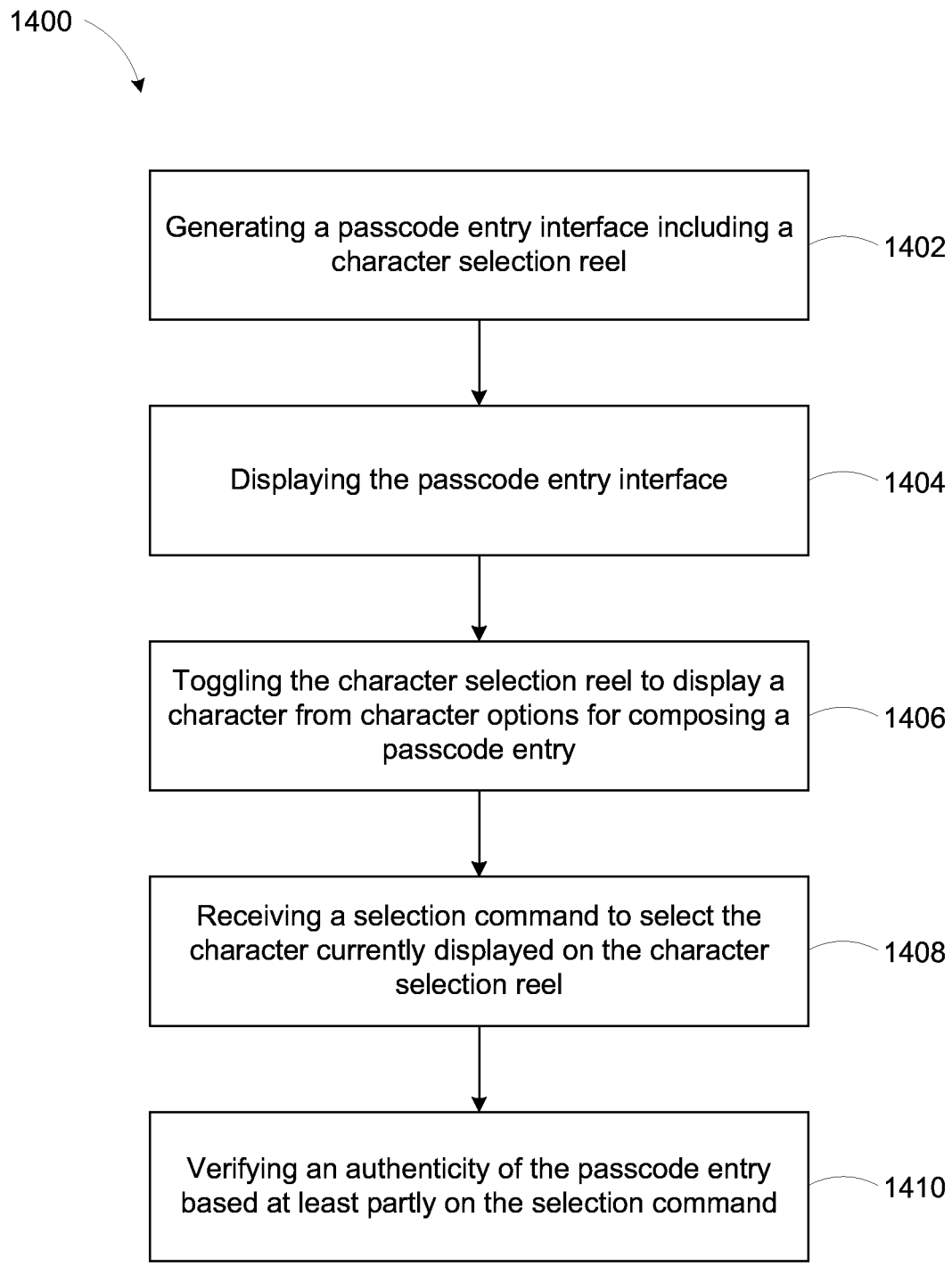
FIG. 14 is a flow chart of a process of operating an electronic device for passcode entry through a character selection reel.

FIG. 14 is a flow chart of a process 1400 of operating an electronic device, such as the electronic device 102 of FIG. 1 or the electronic device 200 of FIG. 2, for passcode entry through a character selection reel. The electronic device generates a passcode entry interface including at least a character selection reel at step 1402. The passcode entry interface may be generated based on a passcode interface configuration file, such as the passcode interface configurations stored on the interface configuration store 204 of FIG. 2. For example, the passcode interface configuration can indicate an initial state of the character selection reel and the sequence of characters on the character selection reel. The passcode entry interface may include multiple character selection reels. The character selection reel is configured to toggle amongst different character options for composing a passcode entry. Step 1402 may be performed by the passcode interface module 202.

Next, at step 1404, the electronic device displays the passcode entry interface on a touchscreen of the electronic device. When displaying the passcode entry interface, the electronic device can position the passcode entry interface at a corner of the touchscreen to enable a user to cover a passcode entry with his or her hand. Step 1404 may be performed by the passcode interface module 202.

The user may interact with the character selection reel of the passcode entry interface on the touchscreen or from a hardware mechanism on a docking station, such as the docking station 106 of FIG. 1, coupled to the electronic device. In response to such user input, the electronic device toggles the character selection reel to display a character from amongst the character options for composing a passcode entry at step 1406. The electronic device can detect a user input, for example, by detecting a spin gesture over a dial element of the user interface on the touchscreen. As another example, the electronic device can detect a user input by detecting a swipe gesture over the character selection reel. As yet another example, the electronic device can detect a user input when the electronic device receives a toggle command from a docking station, such as the docking station 106 of FIG. 1, detachably coupled to the electronic device. Step 1406 may be performed by the input device driver 208.

Next, the electronic device can receive a selection command via a user input to select the character currently displayed on the character selection reel at step 1408. The selection command may be based on pressing of a button element on the touchscreen. The selection command may also be received from the docking station detachably coupled to the electronic device. Step 1408 may be performed by the input device driver 208.

The electronic device verifies an authenticity of the passcode entry based at least partly on the selection command at step 1410. Step 1410 can include sending the selection command to an external system, such as the remote backend system 203 of FIG. 2. The external system can match the selection command to the passcode interface configuration to determine the passcode entry made by the user. Alternatively, the matching may be done on the electronic device. Step 1410 may be performed by the passcode interface module 202 and/or the communication module 210. Once the user confirms completion of the passcode entry, the passcode entry is then used for verification of the user's identity.

Figure 15:
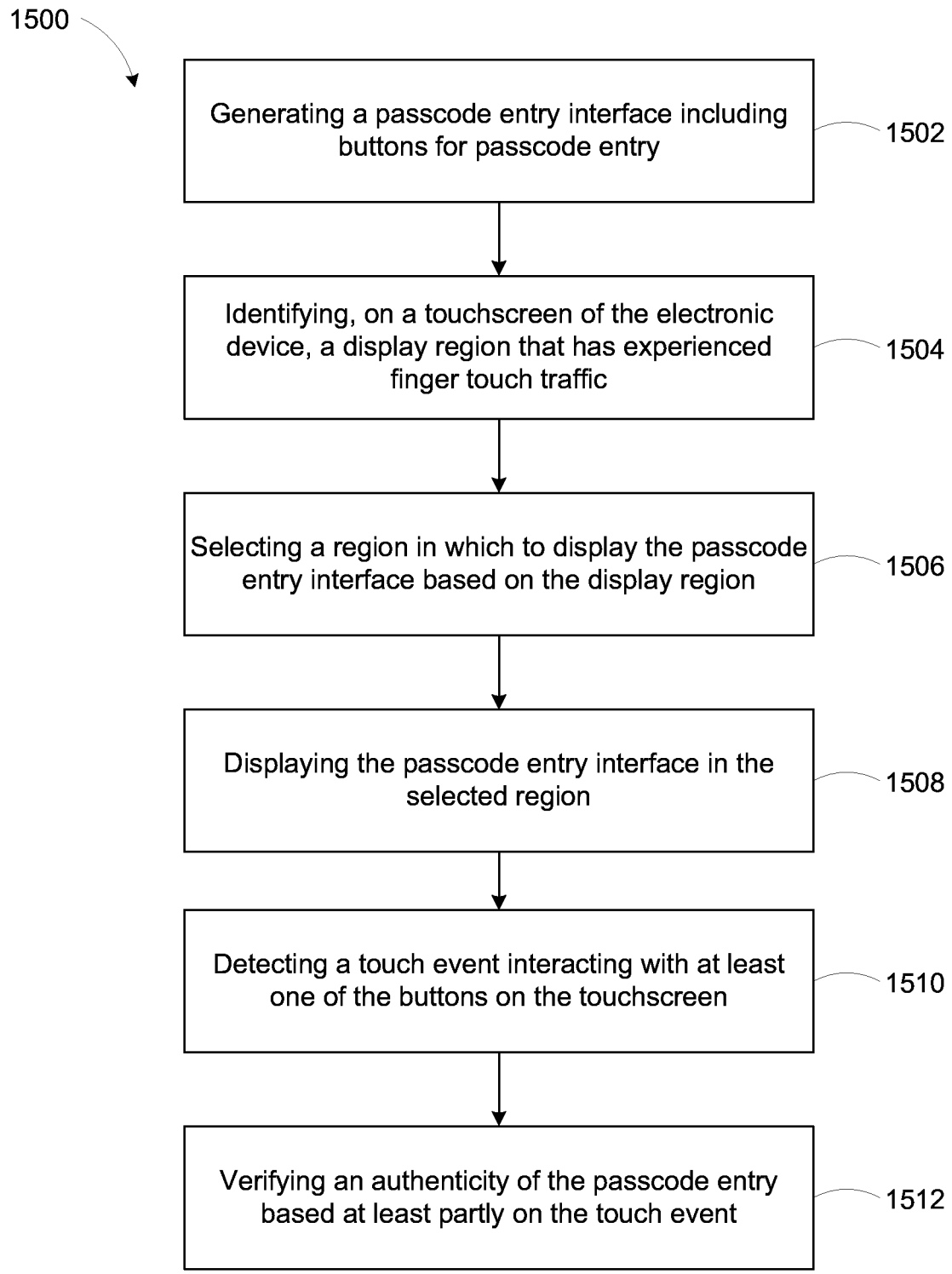
FIG. 15 is a flow chart of a process of operating an electronic device for positioning a passcode entry interface based on finger touch traffic.

FIG. 15 is a flow chart of a process 1500 of operating an electronic device, such as the electronic device 102 of FIG. 1 or the electronic device 200 of FIG. 2, for positioning a passcode entry interface based on finger touch traffic. The electronic device generates a passcode entry interface including buttons at step 1502. The passcode entry interface may be generated based on a passcode interface configuration file, such as the passcode interface configurations stored on the interface configuration store 204 of FIG. 2. The buttons may be scrambled out of sequence. The buttons correspond to and are labeled with individual characters for composing a passcode entry. Step 1502 may be performed by the passcode interface module 202.

Next, the electronic device identifies a traffic region on a touchscreen, such as the touchscreen 114 of FIG. 1, of the electronic device with pre-existing finger touch traffic at step 1504. The traffic region is a portion on the touch screen that has previously experienced finger touch traffic. Identification of the traffic region with pre-existing finger touch traffic may be based on a touch event history. The touch event history is a record of touch events representing user interactions with an interface (e.g., another instance of the passcode entry interface or another interface displayed prior to the passcode entry interface) displayed on the touchscreen. When a second interface has previously been displayed on the touchscreen, the traffic region of pre-existing finger touch traffic may be identified based on a position of where the second interface was previously displayed. In some embodiments, positions of interface elements (e.g., menu items) of the second interface are randomized to distribute finger touch traffic. Once the traffic region is identified, the electronic device selects a region in which to display the passcode entry interfaced based on the traffic region that has experienced finger touch traffic at step 1506. Step 1506 can include positioning the buttons of the passcode entry interface for displaying on the touchscreen. Step 1504 and step 1506 may be performed by the passcode interface module 202. In various embodiments, step 1504 and step 1506 may be performed on the remote backend system 203 of FIG. 2.

Next, at step 1508, the electronic device displays the passcode entry in the selected region with pre-existing finger touch traffic. In some embodiments, the passcode entry interface is displayed over where the second interface was previously displayed. This way, positions of the passcode entry interface and the second interface are swapped from one user session to another. Step 1508 may be performed by the passcode interface module 202.

The user may interact with the passcode entry interface on the touchscreen. Thus, the electronic device can detect a touch event interacting with at least one of the buttons on the touchscreen at step 1510. Step 1510 may be performed by the input device driver 208. The electronic device verifies an authenticity of the passcode entry based at least partly on the touch event at step 1512. Step 1512 can include sending the touch event to an external system, such as the remote backend system 203 of FIG. 2. The external system can match the touch event to the passcode interface configuration to determine the passcode entry made by the user. Alternatively, the matching may be done on the electronic device. Step 1512 may be performed by the passcode interface module 202 and/or the communication module 210. Once the user confirms completion of the passcode entry, the passcode entry is then used for verification of the user's identity.

Figure 16:
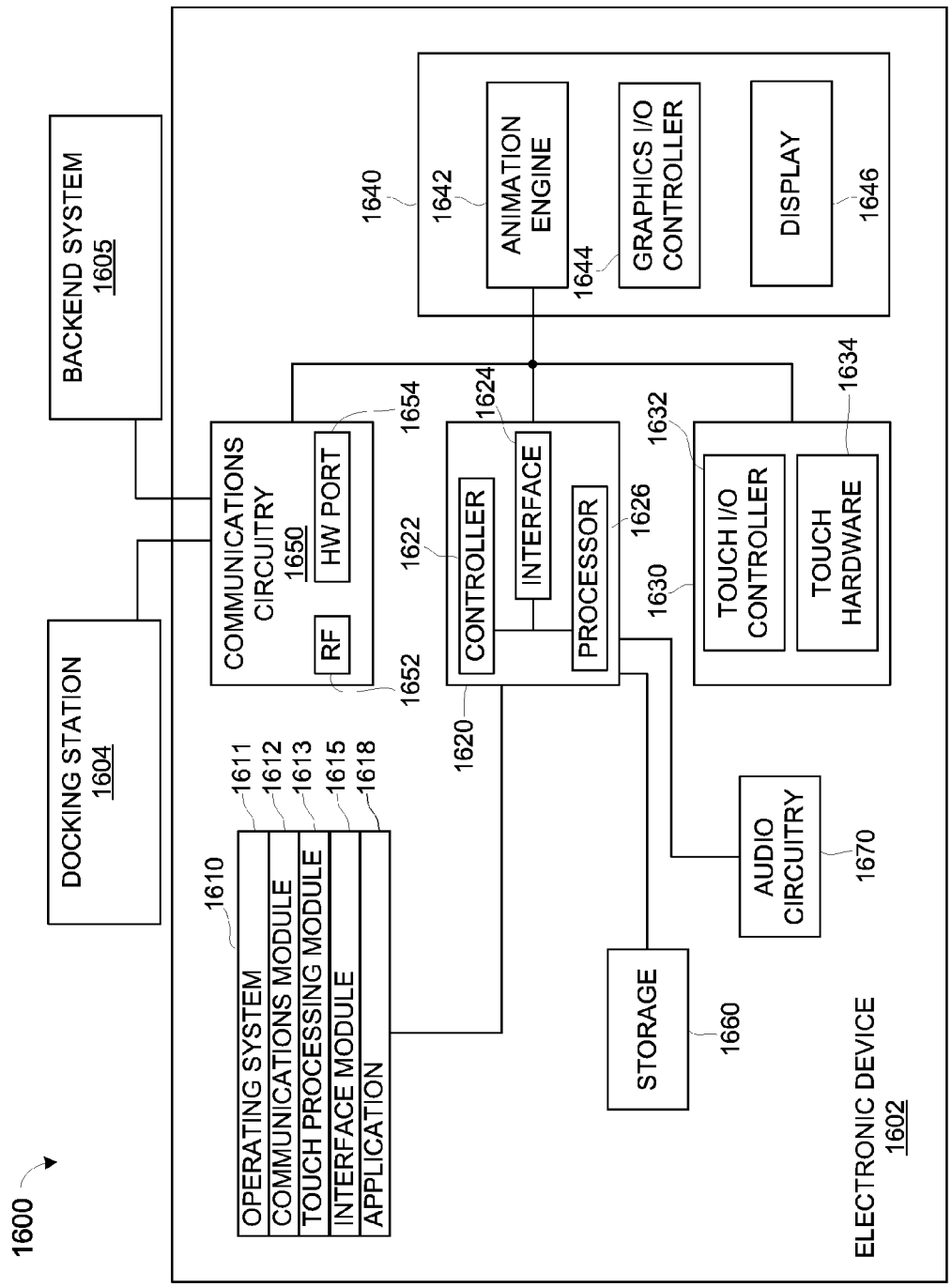
FIG. 16 is a block diagram of a passcode entry system including an electronic device and a docking station.

FIG. 16 is a block diagram of a passcode entry system 1600 including an electronic device 1602 (e.g., the electronic device 200 of FIG. 2), a docking station 1604 (e.g., the docking station 106 of FIG. 1), and a backend system (e.g., the remote backend system 203 of FIG. 2). Note that the architecture shown in FIG. 16 is only one example of an architecture for a passcode entry system in accordance with the technique introduced here; further, the electronic device 1602 in FIG. 16 could have more or fewer components than shown, or a different configuration of components. The various components shown in FIG. 16 can be implemented by using hardware, software, firmware or a combination thereof, including one or more signal processing and/or application specific integrated circuits.

The electronic device 1602 that can include one or more computer-readable mediums 1610, processing system 1620, touch subsystem 1630, display/graphics subsystem 1640, communications circuitry 1650, storage 1660, and audio circuitry 1670. These components may be coupled by one or more communication buses or other signal lines. The electronic device 1602 can be the same as or similar to the electronic device 102, the electronic device 200, or the electronic device 400.

The communications circuitry 1650 can include RF circuitry 1652 and/or port 1654 for sending and receiving information. The RF circuitry 1652 permits transmission of information over a wireless link or network to one or more other devices and includes well-known circuitry for performing this function. The port 1654 permits transmission of information over a wired link. The communications circuitry 1650 can communicate, for example, with the docking station 1604 or the backend system 1605 for verifying the passcode entry. The communications circuitry 1650 can be coupled to the processing system 1620 via a peripherals interface 1624. The peripherals interface 1624 can include various known components for establishing and maintaining communication between peripherals and the processing system 1620.

The audio circuitry 1670 can be coupled to an audio speaker (not shown), a microphone (not shown), an electronic card reader (not shown), or any combination thereof and includes known circuitry for processing voice signals received from the peripherals interface 1624 to enable a user to communicate in real-time with other users. In some embodiments, the audio circuitry 1670 includes a headphone jack (not shown).

The peripherals interface 1624 can couple various peripherals, such as an electronic card reader, of the system to one or more processors 1626 and the computer-readable medium 1610. The one or more processors 1626 can communicate with one or more computer-readable mediums 1610 via a controller 1622. The computer-readable medium 1610 can be any device or medium that can store code and/or data for use by the one or more processors 1626. The medium 1610 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 1610 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The one or more processors 1626 can run various software components stored in the medium 1610 to perform various functions for the electronic device 1602. Note that the order of the modules in the medium 1610 does not necessarily denote the order of layers of a software stack as implemented in the medium 1610. In some embodiments, the software components include an operating system 1611, a communication module (or set of instructions) 1612, a touch processing module (or set of instructions) 1612, an interface module (or set of instructions) 1615, such as the passcode interface module 202 of FIG. 2, and one or more applications (or set of instructions) 1618. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, the medium 1610 may store a subset of the modules and data structures identified above. Furthermore, the medium 1610 may store additional modules and data structures not described above.

The operating system 1611 can include various procedures, sets of instructions, software components and/or drivers for controlling and managing general system tasks (e.g., memory management, storage device control, power management, etc.) and facilitates communication between various hardware and software components.

The communication module 1612 facilitates communication with other devices using the communications circuitry 1650 and includes various software components for handling data received from the RF circuitry 1652 and/or the port 1654.

The touch processing module 1613 includes various software components for performing various tasks associated with touch hardware 1634 including but not limited to receiving and processing touch input received from the I/O device 1630 via a touch I/O device controller 1632. For example, the touch processing module 1613 can also include software components for performing tasks associated with other I/O devices (not shown).

The interface module 1615 is configured to present and maintain a passcode interface for a user to enter a passcode to authenticate the user's identity. The interface module 1615 can include various known software components for rendering, animating and displaying graphical objects on a display surface. In embodiments, in which the touch hardware 1634 is a touch sensitive display (e.g., touch screen), the interface module 1615 includes components for rendering, displaying, and animating objects on the touch sensitive display. The interface module 1615 can provide animation instructions to an animation engine 1642, which can render the graphics and provide the rendering to graphics I/O controller 1644, so that the graphics I/O controller 1644 can display the graphics on display 1646. The interface module 1615 can further control the audio circuitry 1670 to provide an auditory component to the passcode interface.

One or more applications 1618 can include any applications installed on the electronic device 1602, including without limitation, modules of the electronic device 200, a browser, keyboard emulation, widgets, JAVA-enabled applications, encryption, digital rights management, voice recognition, voice replication, location determination capability (such as that provided by the global positioning system (GPS)), etc.

The touch I/O controller 1632 is coupled to the touch hardware 1634 for controlling or performing various functions. The touch hardware 1632 communicates with the processing system 1620 via the touch I/O device controller 1632, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 1634 displays visual output to the user in a GUI. The visual output may include text, graphics, video, and any combination thereof. Some or all of the visual output may correspond to user-interface objects. The touch hardware 1634 forms a touch-sensitive surface that accepts touch input from the user. The touch hardware 1634 and the touch controller 1632 (along with any associated modules and/or sets of instructions in the medium 1610) detects and tracks touches or near touches (and any movement or release of the touch) on the touch hardware 1634 and converts the detected touch input into interaction with graphical objects, such as one or more user-interface objects. In the case in which the touch hardware 1634 and the display 1625 are embodied as a touch screen, the user can directly interact with graphical objects that are displayed on the touch screen. Alternatively, in the case in which hardware 1634 is embodied as a touch device other than a touch screen (e.g., a touch pad), the user may indirectly interact with graphical objects that are displayed on a separate display screen.

Embodiments in which the touch hardware 1634 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

Feedback may be provided by the touch hardware 1634 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

In some embodiments, the peripherals interface 1624, the one or more processors 1626, and the memory controller 1622 may be implemented on a single chip. In some other embodiments, they may be implemented on separate chips. The storage 1660 can any suitable medium for storing data, including, for example, volatile memory (e.g., cache, RAM), non-volatile memory (e.g., Flash, hard-disk drive), or a both for storing data, including pages used for transition animations.

Figure 17:
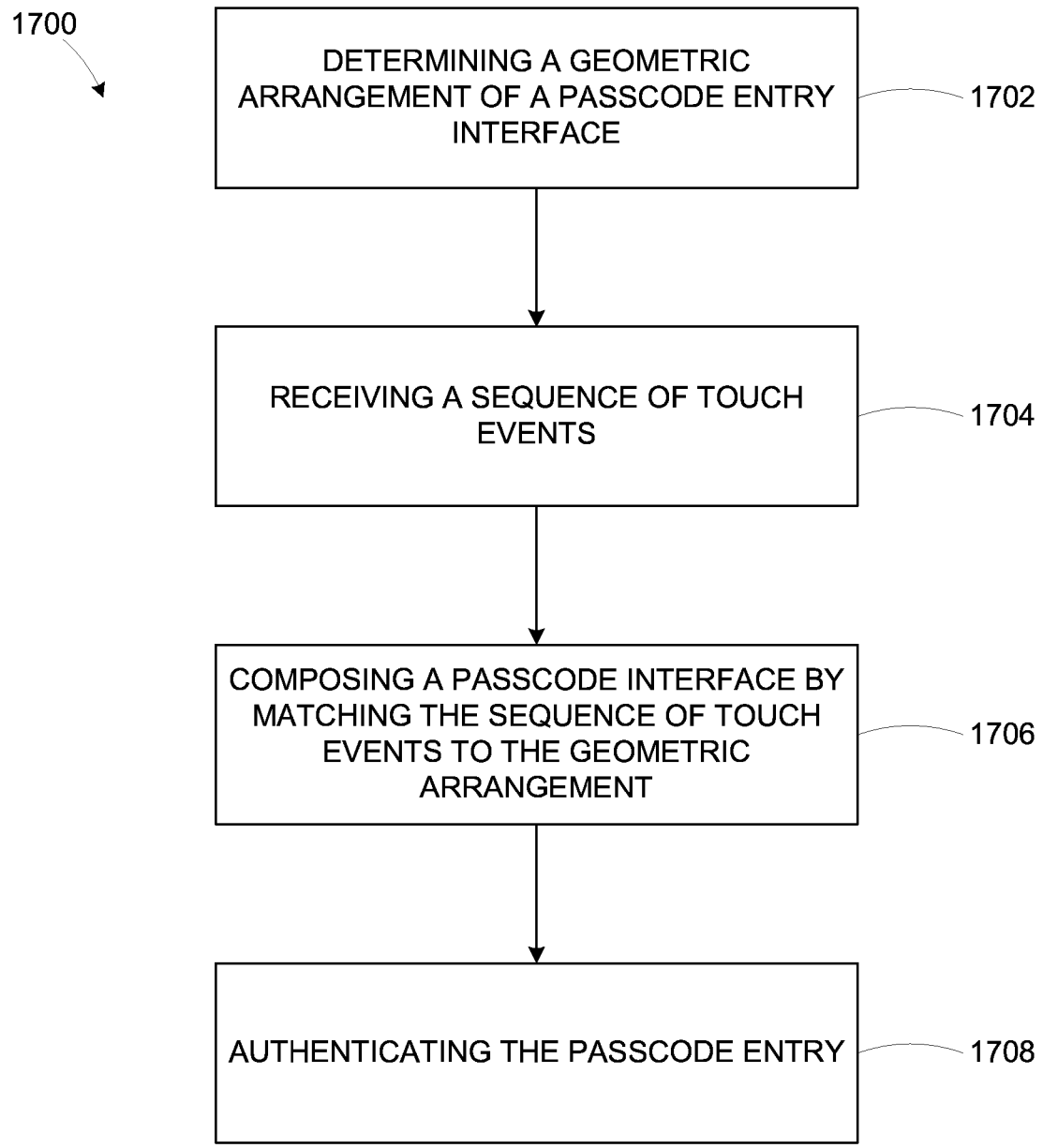
FIG. 17 illustrates a flow chart of a method of operating a computing system for deciphering a passcode by a user.

FIG. 17 is a flow chart of a process 1700 of operating a computing system, such as the remote backend system 203 of FIG. 2, for deciphering a passcode by a user. The computing system determines a geometric arrangement (e.g., position, order, shape, and size in relation to a display screen) of a passcode entry interface for displaying on an electronic device at step 1702. For example, the computing system can determine the geometric arrangement of a plurality of buttons of the passcode entry interface. The plurality of buttons on the passcode entry interface can be used by a user to compose a passcode entry. The plurality of buttons can represent a set of characters, where each button represents a single character. The passcode entry interface may be generated based on a passcode interface configuration file, such as the passcode interface configurations stored on the interface configuration store 204 of FIG. 2. The passcode interface configuration can be generated on the computing system or on the electronic device.

The computing system receives a sequence of touch events from the electronic device at step 1704. The sequence of touch events represents interactions by the user with the plurality of buttons. The sequence of touch events can be indicative of the passcode entry of the user corresponding to a payment card of the user. Next, the computing system composes the passcode entry by matching the sequence of the touch events with the geometric arrangement at step 1706. After step 1706, the computing system authenticates the passcode entry at step 1708, by either requesting an authentication from a financial system or by submitting the passcode entry to the electronic device to cause the electronic device to verify the passcode entry with the payment card. In the first example, the computing system can transmit the passcode entry and a card identifier of the payment card, received from the electronic device, to the financial system. In the second example, the computing system can transmit the passcode entry to the electronic device, so that the electronic device can verify the passcode entry with the payment card through a card reader coupled to the electronic device.

Regarding the processes 1300, 1400, 1500 and 1700, while the various steps, blocks or sub-processes are presented in a given order, alternative embodiments may perform routines having steps, or employ systems having steps, blocks or sub-processes, in a different order, and some steps, sub-processes or blocks may be deleted, moved, added, subdivided, combined, and/or modified to provide alternative or subcombinations. Each of these steps, blocks or sub-processes may be implemented in a variety of different ways. Also, while steps, sub-processes or blocks are at times shown as being performed in series, some steps, sub-processes or blocks may instead be performed in parallel, or may be performed at different times as will be recognized by a person of ordinary skill in the art.

Figure 18:
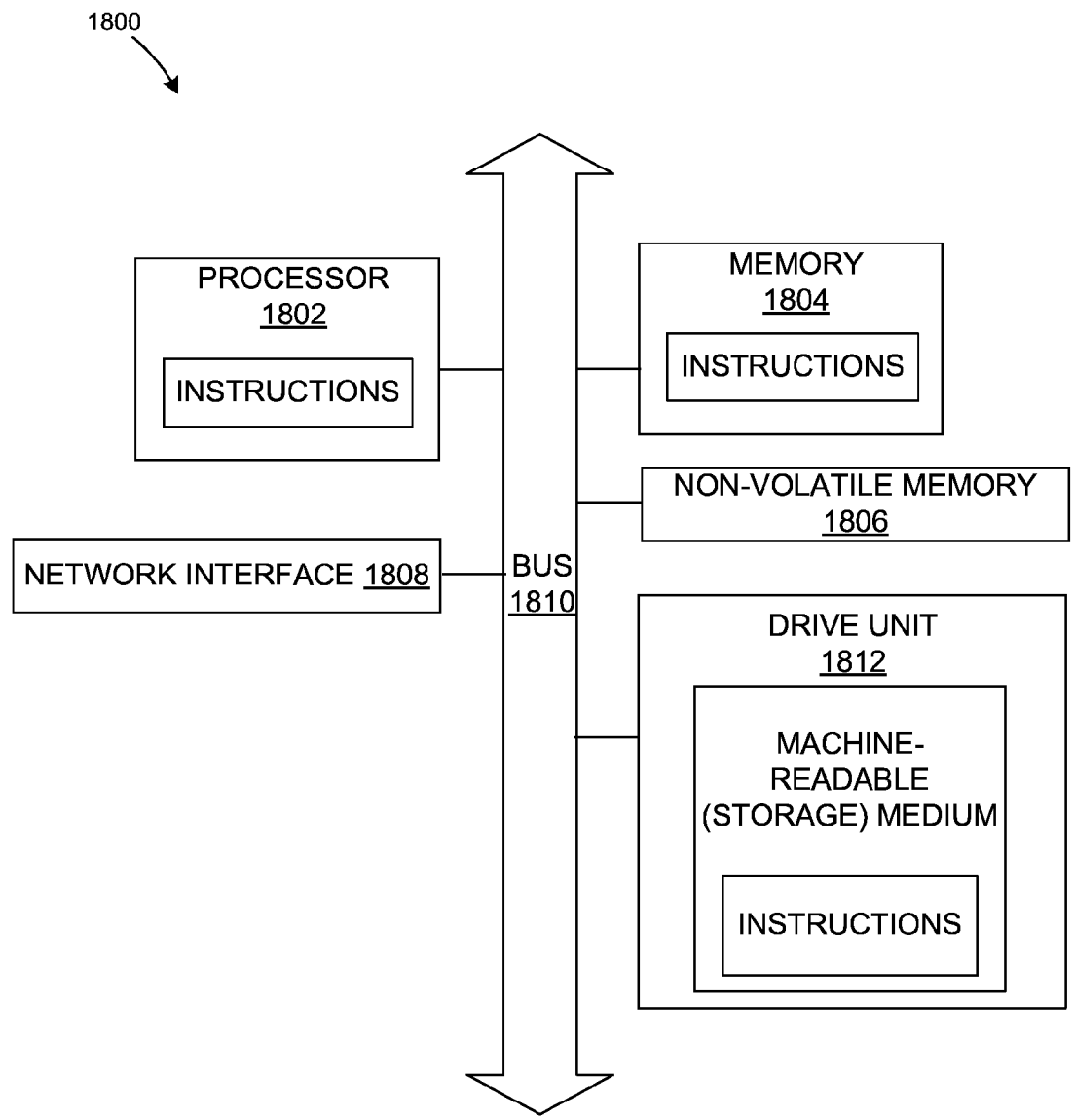
FIG. 18 is a diagrammatic representation of a computer system.

FIG. 18 is a diagrammatic representation of a computer system 1800. The computer system 1800 is intended to illustrate a hardware device on which the remote backend system 203 of FIG. 2 or any other modules and/or components described in this specification can be implemented. As shown, the computer system 1800 includes a processor 1802, memory 1804, non-volatile memory 1806, and a network interface 1808. Various common components (e.g., cache memory) are omitted for illustrative simplicity. The computer system 1800 can be of any applicable known or convenient type, such as a personal computer (PC), server-class computer or mobile device (e.g., smartphone, card reader, tablet computer, etc.). The components of the computer system 1800 can be coupled together via a bus and/or through any other known or convenient form of interconnect.

One of ordinary skill in the relevant art will recognize that the terms "machine-readable (storage) medium" or "computer-readable (storage) medium" include any type of device that is accessible by the processor 1802. The memory 1804 is coupled to the processor 1802 by, for example, a bus 1810. The memory 1804 can include, by way of example but not limitation, random access memory (RAM), such as dynamic RAM (DRAM) and static RAM (SRAM). The memory 1804 can be local, remote, or distributed.

The bus 1810 also couples the processor 1802 to the non-volatile memory 1806 and drive unit. The non-volatile memory 1806 may be a hard disk, a magnetic-optical disk, an optical disk, a read-only memory (ROM), such as a CD-ROM, Erasable Programmable Read-Only Memory (EPROM), or Electrically Erasable Programmable Read-Only Memory (EEPROM), a magnetic or optical card, or another form of storage for large amounts of data. The non-volatile storage 1806 can be local, remote, or distributed.

The modules described in FIG. 3 may be stored in the non-volatile memory 1806, a drive unit 1812, or the memory 1804. The processor 1802 may execute one or more of the modules stored in the memory components.

The bus 1810 also couples the processor 1802 to the network interface device 1808. The interface 1808 can include one or more of a modem or network interface. A modem or network interface can be considered to be part of the computer system 1800. The interface 1808 can include an analog modem, ISDN modem, cable modem, token ring interface, satellite transmission interface (e.g., "direct PC"), or other interfaces for coupling a computer system to other computer systems.

Each section or figure of this disclosure may exemplify different implementations and relationships between elements and terms. However, similar elements and terms referred in the different sections of this disclosure and the drawings can, in some cases, be compatible with each other in various embodiments.

What is claimed is:

1. A method of operating a mobile device, the method comprising:
    detecting a swipe of a payment card on a card reader coupled to the mobile device;
    in response to detecting the swipe, initiating a financial transaction between a consumer and a merchant by:
        identifying, on a touchscreen of the mobile device, a traffic region that experienced touch events prior to said initiating of the financial transaction, wherein identifying the traffic region includes counting historical touch events within a grid cell of the touchscreen to determine whether a count of the historical touch events exceeds a touch event count threshold;
        generating a personal identification number (PIN) entry interface that includes a plurality of buttons for the consumer to compose a PIN entry, wherein the PIN entry interface is smaller than a fullscreen size of the touchscreen and wherein the buttons are repositionable to a different region the touchscreen;
        in response to identifying the traffic region, positioning at least one of the buttons on the traffic region of the touchscreen of the mobile device; and
        detecting a sequence of touch events on the touchscreen while the PIN entry interface is displayed on the touchscreen, wherein the sequence of touch events is indicative of a PIN entry corresponding to the payment card;
        transmitting the sequence of touch events to an external computer server system to authenticate the consumer; and
    in response to receiving a message from the external computer server system that authenticates the consumer, processing the financial transaction.

2. The method of claim 1, wherein the touch events are X and Y coordinates, each indicating where on the touch screen a touch has been detected.

3. The method of claim 1, further comprising encrypting the X and Y coordinates.

4. The method of claim 1, further comprising sending positions of the plurality of buttons to the external computer server system to cause the external computer server system to determine the PIN entry from the sequence of touch events and the positions.

5. The method of claim 1, wherein in response to the mobile device detecting a touch event on the touchscreen, the plurality of buttons is randomly re-arranged.

6. The method of claim 1, wherein identifying the traffic region includes identifying the traffic region from a touch event history of the touchscreen of the mobile device.

7. The method of claim 1, further comprising displaying a mobile storefront including menu items on the touchscreen prior to displaying the PIN entry interface; wherein identifying the traffic region is based on positions of the menu items.

8. A method of operating a computer server system, the method comprising:
    initiating, by the computer server system, a financial transaction involving a mobile device and the server system;
    identifying, by the computer server system and relative to a touchscreen of the mobile device in communications with the server system, a traffic region that experienced touch events prior to said initiating of the financial transaction, wherein the touchscreen is virtually divided into multiple grid cells and wherein identifying the traffic region includes counting historical touch events within a grid cell of the touchscreen to determine whether a count of the historical touch events exceeds a touch event count threshold and adding the grid cell to be part of the traffic region in response to determining that the count exceeds the touch event count threshold;
    in response to identifying the traffic region, positioning, by the computer server system, a plurality of buttons of a passcode entry interface on the traffic region of the touchscreen, wherein the passcode entry interface includes the plurality of buttons for a user to compose a passcode entry, each button representing a character of a set of characters, wherein the plurality of buttons overlaps at least a portion of the traffic region, wherein the passcode entry interface is smaller than a fullscreen size of the touchscreen and the buttons are repositionable to a different region of the touchscreen; and
    transmitting, by the computer server system, positions of the plurality of buttons to the mobile device for displaying.

9. The method of claim 8, further comprising:
    receiving a sequence of touch events, represented as coordinates on the touchscreen from the mobile device, the sequence of touch events indicative of a passcode entry corresponding to a payment card; and
    composing the passcode entry by matching the sequence of touch events with said positioning of the plurality of buttons.

10. The method of claim 9, further comprising receiving a card identifier of the payment card from the mobile device; and transmitting the passcode entry and the card identifier to a financial system for authentication.

11. The method of claim 9, further comprising transmitting the passcode entry to the mobile device to cause the mobile device to verify the passcode entry with the payment card for authentication.

12. The method of claim 8, wherein identifying the traffic region includes identifying the traffic region from a touch event history of the touchscreen of the mobile device.

13. The method of claim 8, further comprising positioning a mobile storefront including menu items on the touchscreen of the mobile device; wherein identifying the traffic region is based on positions of the menu items.

14. A method of operating an electronic device, the method comprising:
    receiving, by the electronic device, a request for authenticating a user;
    in response to the request, generating, by the electronic device, a passcode entry interface including buttons corresponding to character options for composing a passcode entry, wherein the passcode entry interface is used to receive the passcode entry to authenticate a user, wherein the passcode entry interface is smaller than a fullscreen size of a touchscreen of the electronic device;
    identifying, by the electronic device and relative to the touchscreen of the electronic device, a traffic region that experienced touch events prior to receiving the request, wherein identifying the traffic region includes counting historical touch events within a grid cell of the touchscreen to determine whether a first count of the historical touch events exceeds a touch event count threshold and adding the grid cell as part of the traffic region in response to determining that the first count exceeds the touch event count threshold; and positioning, by the electronic device, the passcode entry interface on the traffic region on the touchscreen such that at least one of the buttons overlaps the grid cell and the passcode entry interface does not overlap at least another grid cell that has a second count of historical touch events not exceeding the touch event count threshold.

15. The method of claim 14, further comprising displaying a mobile storefront including menu items on the touchscreen prior to displaying the passcode entry interface; wherein identifying the traffic region is based on positions of the menu items.

16. The method of claim 15, wherein displaying the mobile storefront includes randomizing the positions of the menu items.

17. The method of claim 15, wherein displaying the passcode entry interface includes displaying the passcode entry interface over at least partially where the mobile storefront was previously displayed.

18. The method of claim 15, further comprising swapping positions of the mobile storefront and the passcode entry interface between financial transactions on the electronic device.

19. The method of claim 15, further comprising swapping positions of the mobile storefront and the passcode entry interface between user sessions on the electronic device.

20. The method of claim 14, wherein identifying the traffic region includes identifying the traffic region from a touch event history of the touchscreen.

21. An electronic device comprising:
a connector to receive a request to authenticate a user from a card reader;
a touchscreen;
a processor configured to generate a passcode entry interface that includes a plurality of buttons for the user to compose a passcode entry, each button representing a character of a set of characters, wherein the passcode entry interface is smaller than a fullscreen size of the touchscreen;
wherein the processor is configured to count touch events in a grid cell on the touchscreen prior to receiving the request to authenticate, determine whether the count of the touch events exceeds a touch event count threshold, and, responsive to determining that the count exceeds the touch event count threshold, identify a traffic region to include the grid cell; and
wherein the touchscreen is configured to position the buttons on the traffic region to maximize an overlap between the traffic region and the passcode entry interface and to detect a touch event, represented as coordinates on the touchscreen, interacting with the touchscreen while the buttons are displayed, the touch event indicative of at least a portion of a passcode entry by the user.

* * * * *